(12) United States Patent
Liu et al.

(10) Patent No.: US 10,171,145 B2
(45) Date of Patent: Jan. 1, 2019

(54) CODEBOOK CONFIGURATION METHOD AND USER EQUIPMENT

(71) Applicant: Huawei Technologies Co., Ltd., Shenzhen (CN)

(72) Inventors: Kunpeng Liu, Beijing (CN); Jianghua Liu, Beijing (CN); Leiming Zhang, Beijing (CN)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

(21) Appl. No.: 15/895,666

(22) Filed: Feb. 13, 2018

(65) Prior Publication Data

US 2018/0167117 A1    Jun. 14, 2018

Related U.S. Application Data

(63) Continuation of application No. PCT/CN2015/088307, filed on Aug. 27, 2015.

(30) Foreign Application Priority Data

Aug. 14, 2015    (WO) ................ PCT/CN2015/087115

(51) Int. Cl.
*H04B 7/02* (2018.01)
*H04B 7/0456* (2017.01)
(Continued)

(52) U.S. Cl.
CPC ......... *H04B 7/0478* (2013.01); *H04B 7/0417* (2013.01); *H04B 7/06* (2013.01);
(Continued)

(58) Field of Classification Search
CPC ....... H04L 1/06; H04B 7/0663; H04B 7/0639; H04B 7/0634; H04B 7/063; H04B 7/06; H04B 7/0417; H04B 7/0478
(Continued)

(56) References Cited

U.S. PATENT DOCUMENTS

2011/0249637 A1    10/2011    Hammarwall et al.
2013/0136203 A1    5/2013    Chen et al.
(Continued)

FOREIGN PATENT DOCUMENTS

CN    101917365 A    12/2010
CN    102938688 A    2/2013
(Continued)

OTHER PUBLICATIONS

"3rd Generation Partnership Project;Technical Specification Group Radio Access Network; Evolved Universal Terrestrial Radio Access (E-UTRA);Physical layer procedures (Release 12)," 3GPP TS 36.213 V12.6.0, 3rd Generation Partnership Project, Valbonne, France (Jun. 2015).
(Continued)

*Primary Examiner* — Zewdu Kassa

(74) *Attorney, Agent, or Firm* — Leydig, Voit & Mayer, Ltd.

(57) ABSTRACT

The present invention provides a codebook configuration method and user equipment. The UE receives a reference signal that is of an antenna whose quantity of antenna ports is X and that is sent by a base station and configuration information of a codebook subset restriction for the quantity X of antenna ports, where the configuration information of the codebook subset restriction for the quantity X of antenna ports includes first configuration information and second configuration information; determines, according to the configuration information of the codebook subset restriction for the quantity X of antenna ports, a precoding matrix on which channel measurement and feedback need to be performed; and obtains, by means of measurement according to the reference signal, the precoding matrix on which channel measurement and feedback need to be performed and that is of antenna ports.

16 Claims, 5 Drawing Sheets

(51) Int. Cl.
*H04B 7/06* (2006.01)
*H04L 1/06* (2006.01)
*H04B 7/0417* (2017.01)

(52) U.S. Cl.
CPC .......... *H04B 7/063* (2013.01); *H04B 7/0634* (2013.01); *H04B 7/0639* (2013.01); *H04B 7/0663* (2013.01); *H04L 1/06* (2013.01)

(58) Field of Classification Search
USPC ................ 375/267, 260, 259, 316, 219, 295
See application file for complete search history.

(56) References Cited

U.S. PATENT DOCUMENTS

| | | |
|---|---|---|
| 2013/0272250 A1 | 10/2013 | Shimezawa et al. |
| 2014/0016549 A1 | 1/2014 | Novlan et al. |
| 2014/0192762 A1 | 7/2014 | Li et al. |
| 2014/0376652 A1 | 12/2014 | Sayana et al. |
| 2015/0280875 A1 | 10/2015 | Jing et al. |
| 2017/0041051 A1* | 2/2017 | Rahman ............... H04B 7/0456 |

FOREIGN PATENT DOCUMENTS

| | | |
|---|---|---|
| CN | 103444220 A | 12/2013 |
| CN | 103582141 A | 2/2014 |
| CN | 103687010 A | 3/2014 |
| CN | 104009785 A | 8/2014 |
| WO | 2014073805 A1 | 5/2014 |

OTHER PUBLICATIONS

"On the Performance of the Kronecker Product Based CSI Feedback", 3GPP TSG RAN WG1 Meeting #81, Fukuoka, Japan, R1-152632, pp. 1-5, 3rd Generation Partnership Project, Valbonne, France (May 25-29, 2015).

"2D Codebook with KP structure and Associated Feedback," 3GPP TSG-RAN WG1#81, Fukuoka, Japan, R1-153168, pp. 1-4, 3rd Generation Partnership Project, Valbonne, France (May 25-29, 2015).

* cited by examiner

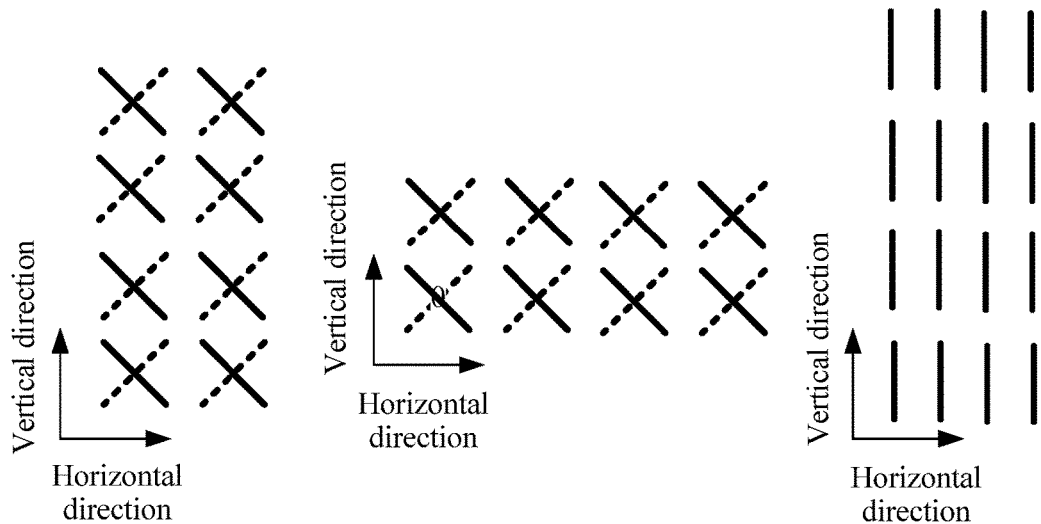

FIG. 1

UE receives a reference signal that is of an antenna whose quantity of antenna ports is X and that is sent by a base station and configuration information of a codebook subset restriction for the quantity X of antenna ports, where the configuration information of the codebook subset restriction for the quantity X of antenna ports includes first configuration information and second configuration information, and X is a positive integer greater than or equal to 2 — 101

The UE determines, according to the configuration information of the codebook subset restriction for the quantity X of antenna ports, a precoding matrix on which channel measurement and feedback need to be performed — 102

The UE obtains, by means of measurement according to the reference signal of the antenna whose quantity of antenna ports is X, the precoding matrix on which channel measurement and feedback need to be performed — 103

FIG. 2

```
┌─────────────────────────────────────────────┐
│   UE receives a reference signal that is of an antenna whose
│   quantity of antenna ports is X and that is sent by a base station
│   and configuration information of a codebook subset restriction
│     for the quantity X of antenna ports, where the configuration
│   information of the codebook subset restriction for the quantity X
│     of antenna ports includes first configuration information and
│        second configuration information; the first configuration       ╲  301
│     information is configuration information of a codebook subset
│       restriction for a quantity X3 of antenna ports; and the second
│        configuration information is configuration information of a
│      codebook subset restriction for a quantity X4 of antenna ports,
│          where the X3 antenna ports and the X4 antenna ports are
│   corresponding to different polarization directions, X = X3 + X4,
│      X3 = X4, and X is a positive integer greater than or equal to 2
└─────────────────────────────────────────────┘
                          │
                          ▼
┌─────────────────────────────────────────────┐
│  The UE determines, according to the configuration information
│  of the codebook subset restriction for the quantity X of antenna
│    ports, a precoding matrix on which channel measurement and        ╲  302
│                   feedback need to be performed
└─────────────────────────────────────────────┘
                          │
                          ▼
┌─────────────────────────────────────────────┐
│    The UE obtains, by means of measurement according to the
│  reference signal of the antenna whose quantity of antenna ports
│   is X, the precoding matrix on which channel measurement and         ╲  303
│                   feedback need to be performed
└─────────────────────────────────────────────┘
```

FIG. 4

CODEBOOK CONFIGURATION METHOD AND USER EQUIPMENT

CROSS-REFERENCE TO RELATED APPLICATIONS

This application is a continuation of International Application No. PCT/CN2015/088307, filed on Aug. 27, 2015, which claims priority to International Application No. PCT/CN2015/087115, filed on Aug. 14, 2015. The disclosures of the aforementioned applications are hereby incorporated by reference in their entireties.

TECHNICAL FIELD

The present invention relates to communications technologies, and in particular, to a codebook configuration method and user equipment.

BACKGROUND

A downlink (DL) of Long Term Evolution (LTE) supports a multiple-input multiple-output (MIMO) technology. An evolved NodeB (eNB) obtains a beamforming gain and a spatial multiplexing gain by using a precoding method. In a frequency division duplex (FDD) mode, the eNB cannot estimate channel information of the DL by using an uplink (UL) channel, and therefore user equipment (UE) reports the channel information of the DL. The UE reports the channel information of the DL to the eNB by using a most proper precoding matrix indication (PMI) and rank indication (RI). The PMI indicates a value of a precoding matrix requested by the UE, and the RI indicates a maximum quantity of layers of signals that can be simultaneously transmitted in a current channel state determined by the UE. However, in some cases, the eNB cannot accept a precoding matrix and a rank that are selected by the UE. For example, the eNB needs to avoid a precoding matrix and a rank that cause significant interference to neighboring cells. A codebook subset restriction technology is introduced in LTE Rel 8 and Rel 9, so as to limit the PMI and the RI that are fed back by the UE. The codebook subset restriction technology is used to send a codebook subset restriction (CSR) bitmap to each UE by using higher layer signaling. Each bit in the CSR bitmap is corresponding to a precoding matrix, and values of bits are 0 and 1. When a bit is set to 0, a precoding matrix corresponding to the bit is limited, and the UE does not need to measure or feed back the precoding matrix corresponding to the bit.

A one-dimensional antenna is used in a conventional two-dimensional (2D) MIMO system, and the one-dimensional antenna can perform beamforming in a horizontal direction. A two-dimensional antenna is currently, introduced to improve antenna performance. The two-dimensional antenna can perform beamforming in both a horizontal direction and a vertical direction. For the two-dimensional antenna, codebook configuration and a feedback mechanism are not defined in the prior art.

SUMMARY

Embodiments of the present invention provide a codebook configuration method and user equipment, so as to perform codebook configuration on a two-dimensional antenna, and reduce feedback overheads of configuration information of a codebook subset restriction.

A first aspect of the present invention provides a codebook configuration method, including:

receiving, by user equipment UE, a reference signal that is of an antenna whose quantity of antenna ports is X and that is sent by a base station and configuration information of a codebook subset restriction for the quantity X of antenna ports, where the configuration information of the codebook subset restriction for the quantity X of antenna ports includes first configuration information and second configuration information, and X is a positive integer greater than or equal to 2;

determining, by the UE according to the configuration information of the codebook subset restriction for the quantity X of antenna ports, a precoding matrix on which channel measurement and feedback need to be performed, where the codebook subset restriction for the quantity X of antenna ports is used to instruct the UE to select some precoding matrices from all precoding matrices in a codebook whose quantity of antenna ports is X for measurement and feedback; and obtaining, by the UE by means of measurement according to the reference signal of the antenna whose quantity of antenna ports is X, the precoding matrix on which channel measurement and feedback need to be performed.

With reference to the first aspect, in a first possible implementation of the first aspect, the first configuration information is configuration information of a codebook subset restriction for a quantity X1 of antenna ports, and the second configuration is configuration information of a codebook subset restriction for a quantity X2 of antenna ports, where X=X1×X2.

With reference to the first aspect, in a second possible implementation of the first aspect, the first configuration information is configuration information of a codebook subset restriction for a quantity X1 of antenna ports, and the second configuration is configuration information of a codebook subset restriction for a quantity X2 of antenna ports, where X=X1×X2×2.

With reference to the first or the second possible implementation of the first aspect, in a third possible implementation of the first aspect, the determining, by the UE according to the configuration information of the codebook subset restriction for the quantity X of antenna ports, a precoding matrix on which channel measurement and feedback need to be performed includes:

performing, by the UE, a Kronecker product on a precoding matrix whose quantity of antenna ports is X1 and a precoding matrix whose quantity of antenna ports is X2 to obtain the precoding matrix on which channel measurement and feedback need to be performed and that is of antenna ports.

With reference to the third possible implementation of the first aspect, in a fourth possible implementation of the first aspect, the performing, by the UE, a Kronecker product on a precoding matrix whose quantity of antenna ports is X1 and a precoding matrix whose quantity of antenna ports is X2 to obtain the precoding matrix on which channel measurement and feedback need to be performed and that is of antenna ports includes:

performing, by the UE, the Kronecker product on the precoding matrix whose quantity of antenna ports is X1 and the precoding matrix whose quantity of antenna ports is X2 to obtain $W_1$ of a precoding matrix whose quantity of antenna ports is X; and obtaining, by the UE according to a formula $W=W_1 *W_2$, the precoding matrix on which channel measurement and feedback need to be performed and that is of antenna ports, where $W_2$ is a matrix whose dimension includes X rows and is used to perform column selection and/or phase adjustment on $W_1$.

With reference to the fourth possible implementation of the first aspect, in a fifth possible implementation of the first aspect, $$W_1 = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1 = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} \ X_V^{l'+1} \ \ldots \ X_V^{l'+N_V^b-1}]$, $l=0, \ldots, L$, $l'=f(l)$, $\tilde{X}_H^k = [X_H^{k'} \ X_H^{k'+1} \ \ldots \ X_H^{k'+N_H^b-1}]$, $k=0, \ldots, K$, $k'=f(k)$, and $\otimes$ represents a Kronecker product, where $\tilde{X}_H^k$ is corresponding to a precoding matrix in a horizontal direction in W1, $\tilde{X}_H^k$ is corresponding to a beam group, $\tilde{X}_H^k$ is a set that includes at least two column vectors, each column vector of $\tilde{X}_H^k$ is a discrete Fourier transform (DFT) vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction in W1, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; and $N_V^b$ is a quantity of vectors in a beam group in the vertical direction; and the first configuration information is configuration information of a codebook subset restriction corresponding to $\tilde{X}_H^k$, and the second configuration information is configuration information of a codebook subset restriction corresponding to $\tilde{X}_V^l$.

With reference to the first aspect, in a sixth possible implementation of the first aspect, a precoding matrix included in the codebook whose quantity of antenna ports is X is represented as $W=W_1(k,l)*W_2$, where $$W_1(k, l) = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1(k, l) = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} \ X_V^{l'+1} \ \ldots \ X_V^{l'+N_V^b-1}]$, $l=0, \ldots, L$, $l'=f(l)$, $\tilde{X}_H^k = [X_H^{k'} \ X_H^{k'+1} \ \ldots \ X_H^{k'+N_H^b-1}]$, $k=0, \ldots, K$, $k'=f(k)$, and $\otimes$ represents a Kronecker product, where $\tilde{X}_H^k$ is corresponding to a precoding matrix in a horizontal direction, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; $N_V^b$ is a quantity of vectors in a beam group in the vertical direction; and $W_2$ is a matrix whose dimension includes X rows and is used to perform column selection and/or phase adjustment on $W_1(k,l)$; and the first configuration information is configuration information of a codebook subset restriction corresponding to $W_1(k,l)$ and the second configuration information is configuration information of a codebook subset restriction corresponding to $W_2$; or the first configuration information includes fifth sub-configuration information and sixth sub-configuration information, where the fifth sub-configuration information is configuration information of a codebook subset restriction corresponding to $\tilde{X}_H^k$, and the sixth sub-configuration information is configuration information of a codebook subset restriction corresponding to $\tilde{X}_V^l$, and the second configuration information is configuration information of a codebook subset restriction corresponding to $W_2$.

With reference to any one of the first aspect, or the first to the sixth possible implementations of the first aspect, in a seventh possible implementation of the first aspect, both the first configuration information and the second configuration information are sent by using higher layer signaling; or the first configuration information is sent by using higher layer signaling, and the second configuration information is sent by using dynamic signaling; or both the first configuration information and the second configuration information are sent by using higher layer signaling.

With reference to any one of the first to the sixth possible implementations of the first aspect, in an eighth possible implementation of the first aspect, configuration information of a codebook subset restriction of antenna ports for a larger quantity of antenna ports in X1 and X2 is configured by using dynamic signaling, and configuration information of a codebook subset restriction of antenna ports for a smaller quantity of antenna ports in X1 and X2 is configured by using higher layer signaling; or configuration information of a codebook subset restriction of antenna ports for a larger quantity of antenna ports in X1 and X2 is configured by using higher layer signaling, and configuration information of a codebook subset restriction of antenna ports for a smaller quantity of antenna ports in X1 and X2 is configured by using dynamic signaling.

With reference to the first possible implementation of the first aspect, in a ninth possible implementation of the first aspect, a precoding matrix in a codebook whose quantity of antenna ports is X1 is represented as $W^a = W_1^a \cdot W_2^a$, where $$W_1^a = \begin{bmatrix} \tilde{X}_H^k & 0 \\ 0 & \tilde{X}_H^k \end{bmatrix},$$

$\tilde{X}_H^k = [X_H^{k'} \ X_H^{k'+1} \ \ldots \ X_H^{k'+N_H^b-1}]$, $k=0, \ldots, K$, $k'=f(k)$, and $\otimes$ represents a Kronecker product, where $W_1^a$ is corresponding to a first precoding matrix that is in a double codebook structure and of the X1 antenna ports in a horizontal direction of the antenna whose quantity of antenna ports is X; $\tilde{X}_H^k$ is corresponding to a matrix in a diagonal position in the first precoding matrix that is in the double codebook structure and of the X1 antenna ports, $\tilde{X}_H^k$ is corresponding to a beam group, each beam is corresponding to a DFT vector, $\tilde{X}_H^k$ is a set that includes at least two column vectors, each column vector of $\tilde{X}_H^k$ is a DFT vector, and a dimension of each column vector of $\tilde{X}_H^k$ is X1/2; K is a total quantity of beam groups corresponding to the X1 antenna ports in the horizontal direction; $N_H^b$ is a quantity of vectors in a beam group corresponding to the X1 antenna ports in the horizontal direction; and $W_2^a$ is corresponding to a second precoding matrix that is in the double codebook structure and of the X1 antenna ports in the horizontal direction of the antenna whose quantity of antenna ports is X, and $W_2^a$ is a matrix whose dimension includes X1 rows and is used to perform column selection and/or phase adjustment on $W_1^a$; and the first configuration information includes first sub-configuration information and second sub-configuration information, where the first sub-configuration information is configuration information of a codebook subset restriction corresponding to $W_1^a$, and the second sub-configuration information is configuration information of a codebook subset restriction corresponding to $W_2^a$; or the first configuration information is configuration information of a codebook subset restriction corresponding to $\tilde{X}_H^k$.

With reference to the ninth possible implementation of the first aspect, in a tenth possible implementation of the first aspect, the first sub-configuration information is sent by using higher layer signaling, and the second sub-configuration information is sent by using dynamic signaling; or the first sub-configuration information is sent by using dynamic signaling, and the second sub-configuration information is sent by using higher layer signaling.

With reference to the first possible implementation of the first aspect or the ninth possible implementation of the first aspect, in an eleventh possible implementation of the first aspect, a precoding matrix in a codebook whose quantity of antenna ports is X2 is represented as $W^b = W_1^b \cdot W_2^b$, where $$W_1^b = \begin{bmatrix} \tilde{X}_V^l & 0 \\ 0 & \tilde{X}_V^l \end{bmatrix},$$

$\tilde{X}_V^l = [X_V^{l'} \ X_V^{l'+1} \ \ldots \ X_V^{l'+N_V^b-1}]$, $l=0, \ldots, L$, $l'=f(l)$, and $\otimes$ represents a Kronecker product, where $W_1^b$ is corresponding to a first precoding matrix that is in a double codebook structure and of the X2 antenna ports in a vertical direction of the antenna whose quantity of antenna ports is X; $\tilde{X}_V^l$ is corresponding to a matrix in a diagonal position in the first precoding matrix that is in the double codebook structure and of the X2 antenna ports, $\tilde{X}_V^l$ is corresponding to a beam group, each beam is corresponding to a DFT vector, $\tilde{X}_V^l$ is a set that includes at least two column vectors, each column vector of $\tilde{X}_V^l$ is a DFT vector, and a dimension of each column vector of $\tilde{X}_V^l$ is X2/2; L is a total quantity of beam groups corresponding to the X2 antenna ports in the vertical direction; $N_V^b$ is a quantity of vectors in a beam group corresponding to the X2 antenna ports in the vertical direction; and $W_2^b$ is corresponding to a second precoding matrix that is in the double codebook structure and of the X2 antenna ports in the vertical direction of the antenna whose quantity of antenna ports is X, and $W_2^b$ is a matrix whose dimension includes X2 rows and is used to perform column selection and/or phase adjustment on $W_1^b$; and the second configuration information includes third sub-configuration information and fourth sub-configuration information, where the third sub-configuration information is configuration information of a codebook subset restriction corresponding to $W_1^b$, and the fourth sub-configuration information is configuration information of a codebook subset restriction corresponding to $W_2^b$; or the second configuration information is configuration information of a codebook subset restriction corresponding to $\tilde{X}_V^l$.

With reference to the eleventh possible implementation of the first aspect, in a twelfth possible implementation of the first aspect, the third sub-configuration information is sent by using higher layer signaling, and the fourth sub-configuration information is sent by using dynamic signaling; or the third sub-configuration information is sent by using dynamic signaling, and the fourth sub-configuration information is sent by using higher layer signaling.

With reference to the first aspect or the sixth possible implementation of the first aspect, in a thirteenth possible implementation of the first aspect, the antenna whose quantity of antenna ports is X is an antenna array with at least two rows and two columns.

With reference to any one of the first to the fifth possible implementations or the ninth to the twelfth possible implementations of the first aspect, in a fourteenth possible implementation of the first aspect, the antenna whose quantity of antenna ports is X is an antenna array with at least two rows and two columns, where the X1 antenna ports are in a same horizontal dimension, and the X2 antenna ports are in a same vertical dimension.

With reference to any one of the first to the fifth possible implementations or the ninth to the twelfth possible implementations of the first aspect, in a fifteenth possible implementation of the first aspect, the antenna whose quantity of antenna ports is X is an antenna array with at least two rows and two columns, where X1 is a quantity of columns of the antenna whose quantity of antenna ports is X, and X2 is a quantity of rows of the antenna whose quantity of antenna ports is X; or X1 is half of a quantity of columns of the antenna whose quantity of antenna ports is X, and X2 is a quantity of rows of the antenna whose quantity of antenna ports is X; or X1 is a quantity of columns of the antenna whose quantity of antenna ports is X, and X2 is half of a quantity of rows of the antenna whose quantity of antenna ports is X.

With reference to the first aspect, in a sixteenth possible implementation of the first aspect, the first configuration information is enabling restriction information of a codebook group obtained after all the precoding matrices in the codebook whose quantity of antenna ports is X are grouped, and grouping of all the precoding matrices in the codebook whose quantity of antenna ports is X is predefined; and the second configuration information is enabling restriction information of a precoding matrix in each codebook group.

With reference to any one of the first to the fifth possible implementations of the first aspect, in a seventeenth possible implementation of the first aspect, the first configuration information is enabling restriction information of a codebook group obtained after all precoding matrices in a codebook whose quantity of antenna ports is X1 are grouped, and grouping of all the precoding matrices in the codebook whose quantity of antenna ports is X1 is predefined; and the second configuration information is enabling restriction information of a precoding matrix in each codebook group; or the first configuration information is enabling restriction information of a codebook group obtained after all precoding matrices in a codebook whose quantity of antenna ports is X2 are grouped, and grouping of all the precoding matrices in the codebook whose quantity of antenna ports is X2 is predefined; and the second configuration information is enabling restriction information of a precoding matrix in each codebook group.

With reference to the sixteenth or the seventeenth possible implementation of the first aspect, in an eighteenth possible implementation of the first aspect, both the first configuration information and the second configuration information are sent by using higher layer signaling; or the first configuration information is sent by using higher layer signaling, and the second configuration information is sent by using dynamic signaling; or the first configuration information is sent by using dynamic signaling, and the second configuration information is sent by using higher layer signaling.

With reference to the first aspect, in a nineteenth possible implementation of the first aspect, the first configuration information is configuration information of a codebook subset restriction for a quantity X3 of antenna ports, and the second configuration information is configuration information of a codebook subset restriction for a quantity X4 of antenna ports, where X=X3+X4, X3=X4, and the X3 antenna ports and the X4 antenna ports are corresponding to different polarization directions.

With reference to any one of the first to the fifth possible implementations of the first aspect, in a twentieth possible implementation of the first aspect, the first configuration information is configuration information of a codebook subset restriction of X5 antenna ports, and the second configuration information is configuration information of a codebook subset restriction of X6 antenna ports, where X1=X5+X6, X5=X6, and the X5 antenna ports and the X6 antenna ports are corresponding to different polarization directions; or the first configuration information is configuration information of a codebook subset restriction of X7 antenna ports, and the second configuration information is configuration information of a codebook subset restriction of X8 antenna ports, where X2=X7+X8, X7=X8, and the X7 antenna ports and the X8 antenna ports are corresponding to different polarization directions.

With reference to the first aspect, in a twenty-first possible implementation of the first aspect, a precoding matrix included in the codebook whose quantity of antenna ports is X may be represented as $W=W_1(k,l)*W_2*W_3$, where $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1(k,l) = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} \ X_V^{l'+1} \ \ldots \ X_V^{l'+N_V^b-1}]$, l=0, ..., L, l'=f(l), $\tilde{X}_H^k = [X_H^{k'} \ X_H^{k'+1} \ \ldots \ X_H^{k'+N_H^b-1}]$, k=0, ..., K, k'=f(k), and $\otimes$ represents a Kronecker product, where $\tilde{X}_H^k$ is corresponding to a precoding matrix in a horizontal direction, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction in W1, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; $N_V^b$ is a quantity of vectors in a beam group in the vertical direction; $W_2$ is a column selection matrix whose dimension includes X rows and is used to perform column selection on $W_1(k,l)$; and $W_3$ is a phase adjustment matrix, and $W_3$ is used to perform phase adjustment between two groups of antennas; and the first configuration information is configuration information of a codebook subset restriction corresponding to $W_1(k,l)$, and the second configuration information is configuration information of a codebook subset restriction corresponding to $W_2$ and configuration information of a codebook subset restriction corresponding to $W_3$; or the first configuration information includes fifth sub-configuration information and sixth sub-configuration information, where the fifth sub-configuration information is configuration information of a codebook subset restriction corresponding to $\tilde{X}_H^k$, and the sixth sub-configuration information is configuration information of a codebook subset restriction corresponding to $\tilde{X}_V^l$ and the second configuration information is configuration information of a codebook subset restriction corresponding to $W_2$ and configuration information of a codebook subset restriction corresponding to $W_3$.

With reference to the first aspect, in a twenty-second possible implementation of the first aspect, if the reference signal of the antenna whose quantity of antenna ports is X is a reference signal that is periodically sent, the determining, by the UE according to the configuration information of the codebook subset restriction for the quantity X of antenna ports, a precoding matrix on which channel measurement and feedback need to be performed and that is of antenna ports includes:

determining, by the UE by using the first configuration information, the precoding matrix on which channel measurement and feedback need to be performed and that is of antenna ports; or if the reference signal of the antenna whose quantity of antenna ports is X is a reference signal that is not periodically sent, the determining, by the UE according to the configuration information of the codebook subset restriction for the quantity X of antenna ports, a precoding matrix on which channel measurement and feedback need to be performed and that is of antenna ports includes:

determining, by the UE by using the second configuration information, the precoding matrix on which channel measurement and feedback need to be performed and that is of antenna ports.

With reference to the first aspect, in a twenty-third possible implementation of the first aspect, both the first configuration information and the second configuration information are sent by using higher layer signaling; or the first configuration information is sent by using higher layer signaling, and the second configuration information is sent by using dynamic signaling; or the first configuration information is sent by using dynamic signaling, and the second configuration information is sent by using higher layer signaling.

With reference to the first aspect, in a twenty-fourth possible implementation of the first aspect, the reference signal is a channel state information-reference signal CSI-RS.

With reference to any one of the seventh, the eighth, the tenth, the twelfth, the eighteenth, the twenty-second, or the twenty-third possible implementation of the first aspect, in a twenty-fifth possible implementation of the first aspect, the dynamic signaling is DL grant signaling or UL grant signaling.

A second aspect of the present invention provides user equipment UE, including:

a receiving module, configured to receive a reference signal that is of an antenna whose quantity of antenna ports is X and that is sent by a base station and configuration information of a codebook subset restriction for the quantity X of antenna ports, where the configuration information of the codebook subset restriction for the quantity X of antenna ports includes first configuration information and second configuration information, and X is a positive integer greater than or equal to 2;

a determining module, configured to determine, according to the configuration information of the codebook subset restriction for the quantity X of antenna ports, a precoding matrix on which channel measurement and feedback need to be performed, where the codebook subset restriction for the quantity X of antenna ports is used to instruct the UE to select some precoding matrices from all precoding matrices in a codebook whose quantity of antenna ports is X for measurement and feedback; and a measurement module, configured to obtain, by means of measurement according to the reference signal of the antenna whose quantity of antenna ports is X, the precoding matrix on which channel measurement and feedback need to be performed.

With reference to the second aspect, in a first possible implementation of the second aspect, the first configuration information is configuration information of a codebook subset restriction for a quantity X1 of antenna ports, and the second configuration is configuration information of a codebook subset restriction for a quantity X2 of antenna ports, where X=X1×X2.

With reference to the second aspect, in a second possible implementation of the second aspect, the first configuration information is configuration information of a codebook subset restriction for a quantity X1 of antenna ports, and the second configuration is configuration information of a codebook subset restriction for a quantity X2 of antenna ports, where X=X1×X2×2.

With reference to the first or the second possible implementation of the second aspect, in a third possible implementation of the second aspect, the determining module is specifically configured to:

perform a Kronecker product on a precoding matrix whose quantity of antenna ports is X1 and a precoding matrix whose quantity of antenna ports is X2 to obtain the precoding matrix on which channel measurement and feedback need to be performed and that is of antenna ports.

With reference to the third possible implementation of the second aspect, in a fourth possible implementation of the second aspect, the determining module is specifically configured to:

perform the Kronecker product on the precoding matrix whose quantity of antenna ports is X1 and the precoding matrix whose quantity of antenna ports is X2 to obtain $W_1$ of a precoding matrix whose quantity of antenna ports is X; and obtain, according to a formula $W=W_1*W_2$, the precoding matrix on which channel measurement and feedback need to be performed and that is of antenna ports, where $W_2$ is a matrix whose dimension includes X rows and is used to perform column selection and/or phase adjustment on $W_1$.

With reference to the fourth possible implementation of the second aspect, in a fifth possible implementation of the second aspect, $$W_1 = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1 = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} X_V^{l'+1} \ldots X_V^{l'+N_V^b-1}]$, l=0, ..., L, l'=f(l), $\tilde{X}_H^k = [X_H^{k'} X_H^{k'+1} \ldots X_H^{k'+N_H^b-1}]$, k=0, ..., K, k'=f(k), and $\otimes$ represents a Kronecker product, where $\tilde{X}_H^k$ is corresponding to a precoding matrix in a horizontal direction in $W_1$, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction in W1, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; and $N_V^b$ is a quantity of vectors in a beam group in the vertical direction; and the first configuration information is configuration information of a codebook subset restriction corresponding to $\tilde{X}_H^k$, and the second configuration information is configuration information of a codebook subset restriction corresponding to $\tilde{X}_V^l$.

With reference to the second aspect, in a sixth possible implementation of the second aspect, a precoding matrix included in the codebook whose quantity of antenna ports is X is represented as $W=W_1(k,l)*W_2$, where $$W_1(k, l) = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1(k, l) = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} X_V^{l'+1} \ldots X_V^{l'+N_V^b-1}]$, l=0, ..., L, l'=f(l), $\tilde{X}_H^k = [X_H^{k'} X_H^{k'+1} \ldots X_H^{k'+N_H^b-1}]$, k=0, ..., K, k'=f(k), and $\otimes$ represents a Kronecker product, where $\tilde{X}_H^k$ is corresponding to a precoding matrix in a horizontal direction, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; $N_V^b$ is a quantity of vectors in a beam group in the vertical direction; and $W_2$ is a matrix whose dimension includes X rows and is used to perform column selection and/or phase adjustment on $W_1(k,l)$; and the first configuration information is configuration information of a codebook subset restriction corresponding to $W_1(k,l)$, and the second configuration information is configuration information of a codebook subset restriction corresponding to $W_2$; or the first configuration information includes fifth sub-configuration information and sixth sub-configuration information, where the fifth sub-configuration information is configuration information of a codebook subset restriction corresponding to $\tilde{X}_H^k$, and the sixth sub-configuration information is configuration information of a codebook subset restriction corresponding to $\tilde{X}_V^l$, and the second configuration information is configuration information of a codebook subset restriction corresponding to $W_2$.

With reference to any one of the second aspect, or the first to the sixth possible implementations of the second aspect, in a seventh possible implementation of the second aspect, both the first configuration information and the second configuration information are sent by using higher layer signaling; or the first configuration information is sent by using higher layer signaling, and the second configuration information is sent by using dynamic signaling; or both the first configuration information and the second configuration information are sent by using higher layer signaling.

With reference to any one of the first to the sixth possible implementations of the second aspect, in an eighth possible implementation of the second aspect, configuration information of a codebook subset restriction of antenna ports for a larger quantity of antenna ports in X1 and X2 is configured by using dynamic signaling, and configuration information of a codebook subset restriction of antenna ports for a smaller quantity of antenna ports in X1 and X2 is configured by using higher layer signaling; or configuration information of a codebook subset restriction of antenna ports for a larger quantity of antenna ports in X1 and X2 is configured by using higher layer signaling, and configuration information of a codebook subset restriction of antenna ports for a smaller quantity of antenna ports in X1 and X2 is configured by using dynamic signaling.

With reference to the first possible implementation of the second aspect, in a ninth possible implementation of the second aspect, a precoding matrix in a codebook whose quantity of antenna ports is X1 is represented as $W^a = W_1^a \cdot W_2^a$, where $$W_1^a = \begin{bmatrix} \tilde{X}_H^k & 0 \\ 0 & \tilde{X}_H^k \end{bmatrix},$$

$\tilde{X}_H^k = [X_H^{k'} X_H^{k'+1} \ldots X_H^{k'+N_H^b-1}]$, $k=0, \ldots, K, k'=f(k)$, and $\otimes$ represents a Kronecker product, where $W_1^a$ is corresponding to a first precoding matrix that is in a double codebook structure and of the X1 antenna ports in a horizontal direction of the antenna whose quantity of antenna ports is X; $\tilde{X}_H^k$ is corresponding to a matrix in a diagonal position in the first precoding matrix that is in the double codebook structure and of the X1 antenna ports, $\tilde{X}_H^k$ is corresponding to a beam group, each beam is corresponding to a DFT vector, $\tilde{X}_H^k$ is a set that includes at least two column vectors, each column vector of $\tilde{X}_H^k$ is a DFT vector, and a dimension of each column vector of $\tilde{X}_H^k$ is X1/2; K is a total quantity of beam groups corresponding to the X1 antenna ports in the horizontal direction; $N_H^b$ is a quantity of vectors in a beam group corresponding to the X1 antenna ports in the horizontal direction; and $W_2^a$ is corresponding to a second precoding matrix that is in the double codebook structure and of the X1 antenna ports in the horizontal direction of the antenna whose quantity of antenna ports is X, and $W_2^a$ is a matrix whose dimension includes X1 rows and is used to perform column selection and/or phase adjustment on $W_1^a$; and the first configuration information includes first sub-configuration information and second sub-configuration information, where the first sub-configuration information is configuration information of a codebook subset restriction corresponding to $W_1^a$, and the second sub-configuration information is configuration information of a codebook subset restriction corresponding to $W_2^a$; or the first configuration information is configuration information of a codebook subset restriction corresponding to $\tilde{X}_H^k$.

With reference to the ninth possible implementation of the second aspect, in a tenth possible implementation of the second aspect, the first sub-configuration information is sent by using higher layer signaling, and the second sub-configuration information is sent by using dynamic signaling; or the first sub-configuration information is sent by using dynamic signaling, and the second sub-configuration information is sent by using higher layer signaling.

With reference to the first possible implementation of the second aspect or the ninth possible implementation of the second aspect, in an eleventh possible implementation of the second aspect, a precoding matrix in a codebook whose quantity of antenna ports is X2 is represented as $W^b = W_1^b \cdot W_2^b$, where $$W_1^b = \begin{bmatrix} \tilde{X}_V^l & 0 \\ 0 & \tilde{X}_V^l \end{bmatrix},$$

$\tilde{X}_V^l = [X_V^{l'} X_V^{l'+1} \ldots X_V^{l'+N_V^b-1}]$, $l=0, \ldots, L, l'=f(l)$, and $\otimes$ represents a Kronecker product, where $W_1^b$ is corresponding to a first precoding matrix that is in a double codebook structure and of the X2 antenna ports in a vertical direction of the antenna whose quantity of antenna ports is X; $\tilde{X}_V^l$ is corresponding to a matrix in a diagonal position in the first precoding matrix that is in the double codebook structure and of the X2 antenna ports, $\tilde{X}_V^l$ is corresponding to a beam group, each beam is corresponding to a DFT vector, $\tilde{X}_V^l$ is a set that includes at least two column vectors, each column vector of $\tilde{X}_V^l$ is a DFT vector, and a dimension of each column vector of $\tilde{X}_V^l$ is X2/2; L is a total quantity of beam groups corresponding to the X2 antenna ports in the vertical direction; $N_V^b$ is a quantity of vectors in a beam group corresponding to the X2 antenna ports in the vertical direction; and $W_2^b$ is corresponding to a second precoding matrix that is in the double codebook structure and of the X2 antenna ports in the vertical direction of the antenna whose quantity of antenna ports is X, and $W_2^b$ is a matrix whose dimension includes X2 rows and is used to perform column selection and/or phase adjustment on $W_1^b$; and the second configuration information includes third sub-configuration information and fourth sub-configuration information, where the third sub-configuration information is configuration information of a codebook subset restriction corresponding to $W_1^b$, and the fourth sub-configuration information is configuration information of a codebook subset restriction corresponding to $W_2^b$; or the second configuration information is configuration information of a codebook subset restriction corresponding to $\tilde{X}_V^l$.

With reference to the eleventh possible implementation of the second aspect, in a twelfth possible implementation of the second aspect, the third sub-configuration information is sent by using higher layer signaling, and the fourth sub-configuration information is sent by using dynamic signaling; or the third sub-configuration information is sent by using dynamic signaling, and the fourth sub-configuration information is sent by using higher layer signaling.

With reference to the second aspect or the sixth possible implementation of the second aspect, in a thirteenth possible implementation of the second aspect, the antenna whose quantity of antenna ports is X is an antenna array with at least two rows and two columns.

With reference to any one of the first to the fifth possible implementations or the ninth to the twelfth possible implementations of the second aspect, in a fourteenth possible implementation of the second aspect, the antenna whose quantity of antenna ports is X is an antenna array with at least two rows and two columns, where the X1 antenna ports are in a same horizontal dimension, and the X2 antenna ports are in a same vertical dimension.

With reference to any one of the first to the fifth possible implementations or the ninth to the twelfth possible implementations of the second aspect, in a fifteenth possible implementation of the second aspect, the antenna whose quantity of antenna ports is X is an antenna array with at least two rows and two columns, where X1 is a quantity of columns of the antenna whose quantity of antenna ports is X, and X2 is a quantity of rows of the antenna whose quantity of antenna ports is X; or X1 is half of a quantity of columns of the antenna whose quantity of antenna ports is X, and X2 is a quantity of rows of the antenna whose quantity of antenna ports is X; or X1 is a quantity of columns of the antenna whose quantity of antenna ports is X, and X2 is half of a quantity of rows of the antenna whose quantity of antenna ports is X.

With reference to the second aspect, in a sixteenth possible implementation of the second aspect, the first configuration information is enabling restriction information of a codebook group obtained after all the precoding matrices in the codebook whose quantity of antenna ports is X are grouped, and grouping of all the precoding matrices in the codebook whose quantity of antenna ports is X is predefined; and the second configuration information is enabling restriction information of a precoding matrix in each codebook group.

With reference to any one of the first to the fifth possible implementations of the second aspect, in a seventeenth possible implementation of the second aspect, the first configuration information is enabling restriction information of a codebook group obtained after all precoding matrices in a codebook whose quantity of antenna ports is X1 are grouped, and grouping of all the precoding matrices in the codebook whose quantity of antenna ports is X1 is predefined; and the second configuration information is enabling restriction information of a precoding matrix in each codebook group; or the first configuration information is enabling restriction information of a codebook group obtained after all precoding matrices in a codebook whose quantity of antenna ports is X2 are grouped, and grouping of all the precoding matrices in the codebook whose quantity of antenna ports is X2 is predefined; and the second configuration information is enabling restriction information of a precoding matrix in each codebook group.

With reference to the sixteenth or the seventeenth possible implementation of the second aspect, in an eighteenth possible implementation of the second aspect, both the first configuration information and the second configuration information are sent by using higher layer signaling; or the first configuration information is sent by using higher layer signaling, and the second configuration information is sent by using dynamic signaling; or the first configuration information is sent by using dynamic signaling, and the second configuration information is sent by using higher layer signaling.

With reference to the second aspect, in a nineteenth possible implementation of the second aspect, the first configuration information is configuration information of a codebook subset restriction for a quantity X3 of antenna ports, and the second configuration information is configuration information of a codebook subset restriction for a quantity X4 of antenna ports, where X=X3+X4, X3=X4, and the X3 antenna ports and the X4 antenna ports are corresponding to different polarization directions.

With reference to any one of the first to the fifth possible implementations of the second aspect, in a twentieth possible implementation of the second aspect, the first configuration information is configuration information of a codebook subset restriction of X5 antenna ports, and the second configuration information is configuration information of a codebook subset restriction of X6 antenna ports, where X1=X5+X6, X5=X6, and the X5 antenna ports and the X6 antenna ports are corresponding to different polarization directions; or the first configuration information is configuration information of a codebook subset restriction of X7 antenna ports, and the second configuration information is configuration information of a codebook subset restriction of X8 antenna ports, where X2=X7+X8, X7=X8, and the X7 antenna ports and the X8 antenna ports are corresponding to different polarization directions.

With reference to the second aspect, in a twenty-first possible implementation of the second aspect, a precoding matrix included in the codebook whose quantity of antenna ports is X may be represented as $W=W_1(k,l)*W_2*W_3$, where $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1(k,l) = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} X_V^{l'+1} \ldots X_V^{l'+N_V^b-1}]$, $l=0, \ldots, L, l'=f(l)$, $\tilde{X}_H^k = [X_H^{k'} X_H^{k'+1} \ldots X_H^{k'+N_H^b-1}]$, $k=0, \ldots, K, k'=f(k)$, and $\otimes$ represents a Kronecker product, where $\tilde{X}_H^k$ is corresponding to a precoding matrix in a horizontal direction, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction in W1, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; $N_V^b$ is a quantity of vectors in a beam group in the vertical direction; $W_2$ is a column selection matrix whose dimension includes X rows and is used to perform column selection on $W_1(k,l)$; and $W_3$ is a phase adjustment matrix, and $W_3$ is used to perform phase adjustment between two groups of antennas; and the first configuration information is configuration information of a codebook subset restriction corresponding to $W_1(k,l)$, and the second configuration information is configuration information of a codebook subset restriction corresponding to $W_2$ and configuration information of a codebook subset restriction corresponding to $W_3$; or the first configuration information includes fifth sub-configuration information and sixth sub-configuration information, where the fifth sub-configuration information is configuration information of a codebook subset restriction corresponding to $\tilde{X}_H^k$, and the sixth sub-configuration information is configuration information of a codebook subset restriction corresponding to $\tilde{X}_V^l$, and the second configuration information is configuration information of a codebook subset restriction corresponding to $W_2$ and configuration information of a codebook subset restriction corresponding to $W_3$.

With reference to the second aspect, in a twenty-second possible implementation of the second aspect, if the reference signal of the antenna whose quantity of antenna ports is X is a reference signal that is periodically sent, the determining module is specifically configured to determine, by using the first configuration information, the precoding matrix on which channel measurement and feedback need to be performed and that is of antenna ports; or if the reference signal of the antenna whose quantity of antenna ports is X is a reference signal that is not periodically sent, the determining module is specifically configured to determine, by using the second configuration information, the precoding matrix on which channel measurement and feedback need to be performed and that is of antenna ports.

With reference to the second aspect, in a twenty-third possible implementation of the second aspect, both the first configuration information and the second configuration information are sent by using higher layer signaling; or the first configuration information is sent by using higher layer signaling, and the second configuration information is sent by using dynamic signaling; or the first configuration information is sent by using dynamic signaling, and the second configuration information is sent by using higher layer signaling.

With reference to the second aspect, in a twenty-fourth possible implementation of the second aspect, the reference signal is a channel state information-reference signal CSI-RS.

With reference to any one of the seventh, the eighth, the tenth, the twelfth, the eighteenth, the twenty-second, or the twenty-third possible implementation of the second aspect, in a twenty-fifth possible implementation of the second aspect, the dynamic signaling is DL grant signaling or UL grant signaling.

A third aspect of the present invention provides user equipment UE, including a processor, a memory, a communications interface, and a system bus, where the memory, the communications interface, and the processor are connected and communicate with each other by using the system bus; the memory is configured to store a computer execution instruction; the communications interface is configured to communicate with another device; and the processor is configured to run the computer execution instruction, so that the UE performs the method according to any one of the first aspect, or the first to the twenty-fifth possible implementations of the first aspect of the present invention.

According to the codebook configuration method and the user equipment provided in the embodiments of the present invention, the UE receives the reference signal that is of the antenna whose quantity of antenna ports is X and that is sent by the base station and the configuration information of the codebook subset restriction for the quantity X of antenna ports, where the configuration information of the codebook subset restriction for the quantity X of antenna ports includes the first configuration information and the second configuration information; determines, according to the configuration information of the codebook subset restriction for the quantity X of antenna ports, the precoding matrix on which channel measurement and feedback need to be performed; and obtains, by means of measurement according to the reference signal, the precoding matrix on which channel measurement and feedback need to be performed and that is of antenna ports. In the method, the configuration information of the codebook subset restriction for the quantity X of antenna ports is carried in the first configuration information and the second configuration information for feedback, so as to reduce feedback overheads of the configuration information of the codebook subset restriction.

BRIEF DESCRIPTION OF DRAWINGS

To describe technical solutions in embodiments of the present invention more clearly, the following briefly describes the accompanying drawings. The accompanying drawings in the following description show some embodiments of the present invention, and persons of ordinary skill in the art may still derive other drawings from these accompanying drawings without creative efforts.

FIG. 1 is a schematic structural diagram of three 2D antenna arrays;

FIG. 2 is a flowchart of a codebook configuration method according to Embodiment 1 of the present invention;

FIG. 4 is a flowchart of a codebook configuration method according to Embodiment 3 of the present invention;

DESCRIPTION OF EMBODIMENTS

Figure 3:
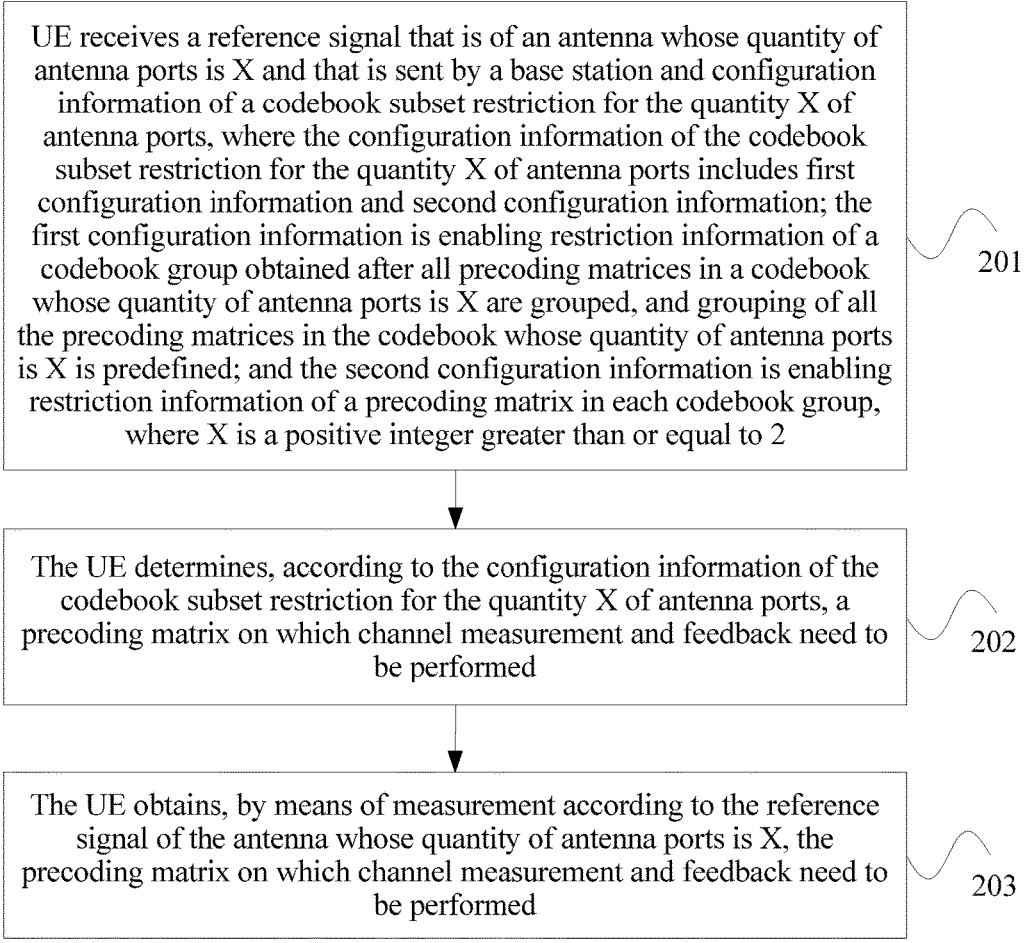
FIG. 3 is a flowchart of a codebook configuration method according to Embodiment 2 of the present invention.

To make objectives, technical solutions, and advantages of embodiments of the present invention clearer, the following clearly describes technical solutions in embodiments of the present invention with reference to the accompanying drawings. The described embodiments are some but not all of the embodiments of the present invention. All other embodiments obtained by persons of ordinary skill in the art based on the embodiments of the present invention without creative efforts shall fall within the protection scope of the present invention.

A two-dimensional (2D) antenna is introduced in the present invention, and the 2D antenna can perform beamforming in both horizontal and vertical directions. FIG. 1 is a schematic structural diagram of three 2D antenna arrays. As shown in FIG. 1, the first 2D antenna array is a 4×4 antenna array, the second 2D antenna array is a 2×8 antenna array, and the third 2D antenna array is a 4×4 antenna array. However, no codebook is configured for the 2D antenna in a current technology.

To resolve a prior-art problem, Embodiment 1 of the present invention provides a codebook configuration method. FIG. 2 is a flowchart of the codebook configuration method according to Embodiment 1 of the present invention. As shown in FIG. 2, the method provided in this embodiment may include the following steps.

Step 101: UE receives a reference signal that is of an antenna whose quantity of antenna ports is X and that is sent by a base station and configuration information of a codebook subset restriction for the quantity X of antenna ports, where the configuration information of the codebook subset restriction for the quantity X of antenna ports includes first configuration information and second configuration information, and X is a positive integer greater than or equal to 2.

The reference signal may be a channel state information-reference signal (CSI-RS). The antenna whose quantity of antenna ports is X is an antenna array with at least two rows and two columns.

Step 102: The UE determines, according to the configuration information of the codebook subset restriction for the quantity X of antenna ports, a precoding matrix on which channel measurement and feedback need to be performed.

In this embodiment, the codebook subset restriction for the quantity X of antenna ports is used to instruct the UE to select a subset of some precoding matrices from a set of all precoding matrices in a codebook whose quantity of antenna ports is X for measurement and feedback. The configuration information of the codebook subset restriction for the quantity X of antenna ports may be a CSR bitmap. Each bit in the bitmap is corresponding to a precoding matrix, and values of bits are 0 and 1. When a bit is set to 0, a precoding matrix corresponding to the bit is limited, and the UE does not need to measure or feed back the precoding matrix corresponding to the bit; or when a bit is set to 1, the UE needs to measure and feed back a precoding matrix corresponding to the bit.

Optionally, the first configuration information is configuration information of a codebook subset restriction for a quantity X1 of antenna ports, and the second configuration is configuration information of a codebook subset restriction for a quantity X2 of antenna ports, where X=X1×X2. For a 2D antenna, the X1 antenna ports may be antenna ports in a horizontal direction of the antenna array whose quantity of antenna ports is X, that is, a quantity of antenna ports included in each row of the antenna array, and the X2 antenna ports may be antenna ports in a vertical direction, that is, a quantity of antenna ports included in each column of the antenna array. Therefore, the first configuration information is configuration information of a codebook subset restriction of the antenna ports in the horizontal direction, and the second configuration information is configuration information of a codebook subset restriction of the antenna ports in the vertical direction. Alternatively, the first configuration information is configuration information of a codebook subset restriction for a quantity X1 of antenna ports, and the second configuration is configuration information of a codebook subset restriction for a quantity X2 of antenna ports, where X=X1×X2×2, and the X1 antenna ports are half of antenna ports in a horizontal direction, or the X2 antenna ports are half of antenna ports in a vertical direction.

The determining, by the UE according to the configuration information of the codebook subset restriction for the quantity X of antenna ports, a precoding matrix on which channel measurement and feedback need to be performed and that is of antenna ports is specifically: performing, by the UE, a Kronecker product on a precoding matrix whose quantity of antenna ports is X1 and a precoding matrix whose quantity of antenna ports is X2 to obtain the precoding matrix on which channel measurement and feedback need to be performed and that is of antenna ports.

The performing, by the UE, a Kronecker product on a precoding matrix whose quantity of antenna ports is X1 and a precoding matrix whose quantity of antenna ports is X2 to obtain the precoding matrix on which channel measurement and feedback need to be performed and that is of antenna ports is specifically: performing, by the UE, the Kronecker product on the precoding matrix whose quantity of antenna ports is X1 and the precoding matrix whose quantity of antenna ports is X2 to obtain $W_1$ of a precoding matrix whose quantity of antenna ports is X; and then obtaining, by the UE according to a formula $W=W_1 * W_2$, the precoding matrix on which channel measurement and feedback need to be performed and that is of antenna ports, where $W_2$ is a matrix whose dimension includes X rows and is used to perform column selection and/or phase adjustment on $W_1$.

$$W_1 = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1 = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} \ X_V^{l'+1} \ \ldots \ X_V^{l'+N_V^b-1}]$, l=0, . . . , L, l'=f(l),
$\tilde{X}_H^k = [X_H^{k'} \ X_H^{k'+1} \ \ldots \ X_H^{k'+N_H^b-1}]$, k=0, . . . , K, k'=f(k),
and $\otimes$ represents a Kronecker product.

$\tilde{X}_H^k$ is corresponding to a precoding matrix in a horizontal direction in $W_1$, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction in W1, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; and $N_V^b$ is a quantity of vectors in a beam group in the vertical direction. Correspondingly, the first configuration information is configuration information of a codebook subset restriction corresponding to $\tilde{X}_H^k$, and the second configuration information is configuration information of a codebook subset restriction corresponding to $\tilde{X}_V^l$.

For example, if the first configuration information is in a form of a bitmap, and it is assumed that a total quantity of precoding matrices $\tilde{X}_H^k$ is K, the bitmap includes a total of K bits, that is, 01010000 . . . 10, precoding matrices $\tilde{X}_H^k$, $\tilde{X}_H^3$, and $\tilde{X}_H^{K-2}$ are enabled, and the UE may perform measurement and feedback based on these precoding matrices. If the second configuration information is also in a form of a bitmap, and it is assumed that a total quantity of precoding matrices $\tilde{X}_V^l$ is L, the bitmap includes a total of L bits, that is, 11000000 . . . 01, precoding matrices $\tilde{X}_V^l$, $\tilde{X}_V^1$, $\tilde{X}_V^{L-1}$ and are enabled, and the UE may perform measurement and feedback based on these precoding matrices.

In this embodiment, the base station may use the following manners to send the configuration information of the codebook subset restriction for the quantity X of antenna ports:

(1) Both the first configuration information and the second configuration information are sent by using higher layer signaling.

(2) The first configuration information is sent by using higher layer signaling, and the second configuration information is sent by using dynamic signaling.

(3) Both the first configuration information and the second configuration information are sent by using higher layer signaling.

(4) Configuration information of a codebook subset restriction of antenna ports for a larger quantity of antenna ports in X1 and X2 is configured by using dynamic signaling, and configuration information of a codebook subset restriction of antenna ports for a smaller quantity of antenna ports in X1 and X2 is configured by using higher layer signaling.

(5) Configuration information of a codebook subset restriction of antenna ports for a larger quantity of antenna ports in X1 and X2 is configured by using higher layer signaling, and configuration information of a codebook subset restriction of antenna ports for a smaller quantity of antenna ports in X1 and X2 is configured by using dynamic signaling.

(6) If a precoding matrix in a codebook whose quantity of antenna ports is X1 is in a double codebook structure, the precoding matrix in the codebook whose quantity of antenna ports is X1 is represented as $W^a = W_1^a \cdot W_2^a$, where $$W_1^a = \begin{bmatrix} \tilde{X}_H^k & 0 \\ 0 & \tilde{X}_H^k \end{bmatrix},$$

$\tilde{X}_H^k = [X_H^{k'} \ X_H^{k'+1} \ \ldots \ X_H^{k'+N_H^b-1}]$, $k=0, \ldots, K, k'=f(k)$, and $\otimes$ represents a Kronecker product.

$W_1^a$ is corresponding to a first precoding matrix that is in a double codebook structure and of the X1 antenna ports in a horizontal direction of the antenna whose quantity of antenna ports is X; $\tilde{X}_H^k$ is corresponding to a matrix in a diagonal position in the first precoding matrix that is in the double codebook structure and of the X1 antenna ports, $\tilde{X}_H^k$ is corresponding to a beam group, each beam is corresponding to a DFT vector, $\tilde{X}_H^k$ is a set that includes at least two column vectors, each column vector of $\tilde{X}_H^k$ is a DFT vector, and a dimension of each column vector of $\tilde{X}_H^k$ is X1/2; K is a total quantity of beam groups corresponding to the X1 antenna ports in the horizontal direction, that is, a total quantity of $W_1^a$; $N_H^b$ is a quantity of vectors in a beam group corresponding to the X1 antenna ports in the horizontal direction; and $W_2^a$ is corresponding to a second precoding matrix that is in the double codebook structure and of the X1 antenna ports in the horizontal direction of the antenna whose quantity of antenna ports is X, and $W_2^a$ is a matrix whose dimension includes X1 rows and is used to perform column selection and/or phase adjustment on $W_1^a$.

Correspondingly, the first configuration information includes first sub-configuration information and second sub-configuration information, where the first sub-configuration information is configuration information of a codebook subset restriction corresponding to $W_1^a$, and the second sub-configuration information is configuration information of a codebook subset restriction corresponding to $W_2^a$. Alternatively, the first configuration information is configuration information of a codebook subset restriction corresponding to $\tilde{X}_H^k$. Optionally, the first sub-configuration information is sent by using higher layer signaling, and the second sub-configuration information is sent by using dynamic signaling; or the first sub-configuration information is sent by using dynamic signaling, and the second sub-configuration information is sent by using higher layer signaling.

In this manner, the beam group corresponding to the X1 antenna ports in the horizontal direction is divided into the K beam groups. Each beam group includes $N_H^b$ precoding vectors, and each beam is used as a column vector of $\tilde{X}_H^k$. $W_2^a$ is the matrix whose dimension includes the X1 rows and is used to perform the column selection on $W_1^a$ and/or the phase adjustment between two groups of antennas.

(7) If a precoding matrix in a codebook whose quantity of antenna ports is X2 is in a double codebook structure, the precoding matrix in the codebook whose quantity of antenna ports is X2 is represented as $W^b = W_1^b \cdot W_2^b$, where $$W_1^b = \begin{bmatrix} \tilde{X}_V^l & 0 \\ 0 & \tilde{X}_V^l \end{bmatrix},$$

$\tilde{X}_V^l = [X_V^{l'} \ X_V^{l'+1} \ \ldots \ X_V^{l'+N_V^b-1}]$, $l=0, \ldots, L, l'=f(l)$, and $\otimes$ represents a Kronecker product.

$W_1^b$ is corresponding to a first precoding matrix that is in a double codebook structure and of the X2 antenna ports in a vertical direction of the antenna array whose quantity of ports is X; $\tilde{X}_V^l$ is corresponding to a matrix in a diagonal position in the first precoding matrix that is in the double codebook structure and of the X2 antenna ports, $\tilde{X}_V^l$ is corresponding to a beam group, each beam is corresponding to a DFT vector, $\tilde{X}_V^l$ is a set that includes at least two column vectors, each column vector of $\tilde{X}_V^l$ is a DFT vector, and a dimension of each column vector of $\tilde{X}_V^l$ is X2/2; L is a total quantity of beam groups corresponding to the X2 antenna ports in the vertical direction, that is, a total quantity of $W_1^b$; $N_V^b$ is a quantity of vectors in a beam group corresponding to the X2 antenna ports in the vertical direction; and $W_2^b$ is corresponding to a second precoding matrix that is in the double codebook structure and of the X2 antenna ports in the vertical direction of the antenna whose quantity of antenna ports is X, and $W_2^b$ is a matrix whose dimension includes X2 rows and is used to perform column selection and/or phase adjustment on $W_1^b$.

Correspondingly, the second configuration information includes third sub-configuration information and fourth sub-configuration information, where the third sub-configuration information is configuration information of a codebook subset restriction corresponding to $W_1^b$, and the fourth sub-configuration information is configuration information of a codebook subset restriction corresponding to $W_2^b$. Alternatively, the second configuration information is configuration information of a codebook subset restriction corresponding to $\tilde{X}_V^l$. Optionally, the third sub-configuration information is sent by using higher layer signaling, and the fourth sub-configuration information is sent by using dynamic signaling; or the third sub-configuration information is sent by using dynamic signaling, and the fourth sub-configuration information is sent by using higher layer signaling.

Optionally, if the precoding matrices in the codebook whose quantity of antenna ports is X1 and the codebook whose quantity of antenna ports is X2 each may be in the double codebook structure, $W = W_1^a * W_1^b$.

In this embodiment, when the antenna whose quantity of antenna ports is X is an antenna array with at least two rows and two columns, the X1 antenna ports are in a same horizontal dimension, and the X2 antenna ports are in a same vertical dimension. In this case, a value of X1 may be less than or equal to a total quantity of antenna ports in a horizontal dimension of the antenna array, and a value of X2 may be less than or equal to a total quantity of antenna ports in a vertical dimension of the antenna array.

Alternatively, X1 is a quantity of columns of the antenna whose quantity of antenna ports is X, and X2 is a quantity of rows of the antenna whose quantity of antenna ports is X; or X1 is half of a quantity of columns of the antenna whose quantity of antenna ports is X, and X2 is a quantity of rows of the antenna whose quantity of antenna ports is X; or X1 is a quantity of columns of the antenna whose quantity of antenna ports is X, and X2 is half of a quantity of rows of the antenna whose quantity of antenna ports is X.

It is assumed that a codebook in the horizontal dimension includes a total of N precoding matrices, configuration information of a codebook subset restriction in the horizontal dimension is $a_0$-$a_{N-1}$, and $a_0$-$a_{N-1}$ is in a form of a bitmap. Each precoding matrix is corresponding to one bit, and a value of each bit is 0 or 1. When a value of a bit is 1, it indicates that a precoding matrix corresponding to the bit is selected, and the UE needs to measure and feed back the selected precoding matrix. When a value of a bit is 0, it indicates that a precoding matrix corresponding to the bit is not selected, and the UE does not need to measure or feed back the selected precoding matrix. It is assumed that N is 5, $a_0$-$a_{N-1}$=01100, and code words that are in positions corresponding to 1 in the bitmap are selected.

In this embodiment, the configuration information of the codebook subset restriction in the horizontal dimension and configuration information of a codebook subset restriction in the vertical dimension are separately fed back, so as to reduce feedback overheads of the configuration information of the codebook subset restriction. For example, for a 2D antenna array, it is assumed that a total of eight precoding matrices in the horizontal direction are selectable, and a total of four precoding matrices in the vertical direction are selectable, and a Kronecker product is performed on the precoding matrices in the horizontal and vertical directions to obtain a total of 32 precoding matrices. If the configuration information of the codebook subset restriction in the horizontal dimension and the configuration information of the codebook subset restriction in the vertical dimension are not separately fed back, a 32-bit bitmap is needed to feed back the configuration information of the codebook subset restriction, but when the configuration information of the codebook subset restriction in the horizontal dimension and the configuration information of the codebook subset restriction in the vertical dimension are separately fed back, only 4 bits are needed in the horizontal dimension, only 8 bits are needed in the vertical dimension, and a total of 12 bits are needed for the codebook subset restriction. Therefore, the feedback overheads of the configuration information of the codebook subset restriction are reduced.

Step 103: The UE obtains, by means of measurement according to the reference signal of the antenna whose quantity of antenna ports is X, the precoding matrix on which channel measurement and feedback need to be performed.

Determining a precoding matrix of antenna ports according to the reference signal of the antenna port is the prior art. Details are not described herein.

According to the codebook configuration method in this embodiment, the UE receives the reference signal that is of the antenna whose quantity of antenna ports is X and that is sent by the base station and the configuration information of the codebook subset restriction for the quantity X of antenna ports, where the configuration information of the codebook subset restriction for the quantity X of antenna ports includes the first configuration information and the second configuration information; determines, according to the configuration information of the codebook subset restriction for the quantity X of antenna ports, the precoding matrix on which channel measurement and feedback need to be performed; and obtains, by means of measurement according to the reference signal, the precoding matrix on which channel measurement and feedback need to be performed and that is of antenna ports. In the method, the configuration information of the codebook subset restriction for the quantity X of antenna ports is carried in the first configuration information and the second configuration information for feedback, so as to reduce the feedback overheads of the configuration information of the codebook subset restriction.

FIG. 3 is a flowchart of a codebook configuration method according to Embodiment 2 of the present invention. As shown in FIG. 3, the method provided in this embodiment may include the following steps.

Step 201: UE receives a reference signal that is of an antenna whose quantity of antenna ports is X and that is sent by a base station and configuration information of a codebook subset restriction for the quantity X of antenna ports, where the configuration information of the codebook subset restriction for the quantity X of antenna ports includes first configuration information and second configuration information; the first configuration information is enabling restriction information of a codebook group obtained after all precoding matrices in a codebook whose quantity of antenna ports is X are grouped, and grouping of all the precoding matrices in the codebook whose quantity of antenna ports is X is predefined; and the second configuration information is enabling restriction information of a precoding matrix in each codebook group, where X is a positive integer greater than or equal to 2.

In this embodiment, all the precoding matrices in the codebook whose quantity of antenna ports is X need to be pre-grouped. For example, all the precoding matrices in the codebook whose quantity of antenna ports is X are $\{W\}=\{C_0, C_1, C_2 \ldots C_{N-1}\}$, and are divided into i codebook groups. The first codebook group is $C_0$~$C_{d-1}$, the second codebook group is $C_d$~$C_{2d-1}$, and the $i^{th}$ codebook group $C_{id}$~$C_{id-1}$. This is merely an example for description, and grouping of the codebook is not limited in the present invention.

In this embodiment, the first configuration information is the enabling restriction information of the codebook group obtained after all the precoding matrices in the codebook whose quantity of antenna ports is X are grouped, and the second configuration information is the enabling restriction information of the precoding matrix in each codebook group. For example, 32 precoding matrices are divided into four codebook groups, and each codebook group includes eight precoding matrices. In this case, the first configuration information carries enabling restriction information of the four codebook groups. For example, the enabling restriction information is 0110, where 1 indicates that a codebook group corresponding to a bit is enabled, and 0 indicates that a codebook group corresponding to a bit is not enabled. In this case, 0110 indicates that the second codebook group and the third codebook group are enabled, and the UE needs to measure precoding matrices in the enabled codebook groups. Further, the base station may specify that the UE measures only some precoding matrices in each codebook group. Therefore, the second configuration information carries enabling restriction information of a precoding matrix in an enabled codebook group. For example, enabling restriction information of a precoding matrix in the second codebook group is 11001001, where 1 indicates that a precoding matrix corresponding to a bit is enabled, and 0 indicates that a precoding matrix corresponding to a bit is not enabled. The UE measures only an enabled precoding matrix. In this case, 11001001 indicates that the UE measures only precoding matrices corresponding to the first, second, fifth, and eighth bits.

Optionally, both the first configuration information and the second configuration information are sent by using higher layer signaling; or the first configuration information is sent by using higher layer signaling, and the second configuration information is sent by using dynamic signaling; or the first configuration information is sent by using dynamic signaling, and the second configuration information is sent by using higher layer signaling.

Step 202: The UE determines, according to the configuration information of the codebook subset restriction for the quantity X of antenna ports, a precoding matrix on which channel measurement and feedback need to be performed.

In this embodiment, the UE first determines an enabled codebook group according to the first configuration information, and further determines, according to the second configuration information, which precoding matrix in the enabled codebook is enabled. The enabled precoding matrix is the precoding matrix on which channel measurement and feedback need to be performed.

Step 203: The UE obtains, by means of measurement according to the reference signal of the antenna whose quantity of antenna ports is X, the precoding matrix on which channel measurement and feedback need to be performed.

In this embodiment, the configuration information of the codebook subset restriction for the quantity X of antenna ports includes the first configuration information and the second configuration information, where the first configuration information is the enabling restriction information of the codebook group obtained after all the precoding matrices in the codebook whose quantity of antenna ports is X are grouped, and the second configuration information is the enabling restriction information of the precoding matrix in each codebook group. The UE determines the enabled codebook group according to the first configuration information, and further determines, according to the second configuration information, the precoding matrix on which channel measurement and feedback need to be performed and that is of antenna ports. The UE obtains, by means of measurement according to the reference signal, the precoding matrix on which channel measurement and feedback need to be performed and that is of antenna ports. In the method, the codebook whose quantity of antenna ports is X is divided into a plurality of codebook groups, and enabling restriction information of the codebook groups and restriction information of a precoding matrix in a codebook group are respectively carried in the first configuration information and the second configuration information for feedback, so as to reduce feedback overheads of the configuration information of the codebook subset restriction.

The method in Embodiment 2 is also applicable to configuration information of codebook subset restrictions of antenna ports in a horizontal direction and a vertical direction. Correspondingly, the first configuration information is enabling restriction information of a codebook group obtained after all precoding matrices in a codebook whose quantity of antenna ports is X1 are grouped, and grouping of all the precoding matrices in the codebook whose quantity of antenna ports is X1 is predefined; and the second configuration information is enabling restriction information of a precoding matrix in each codebook group. Alternatively, the first configuration information is enabling restriction information of a codebook group obtained after all precoding matrices in a codebook whose quantity of antenna ports is X2 are grouped, and grouping of all the precoding matrices in the codebook whose quantity of antenna ports is X2 is predefined; and the second configuration information is enabling restriction information of a precoding matrix in each codebook group.

FIG. 4 is a flowchart of a codebook configuration method according to Embodiment 3 of the present invention. As shown in FIG. 4, the method provided in this embodiment may include the following steps.

Step 301: UE receives a reference signal that is of an antenna whose quantity of antenna ports is X and that is sent by a base station and configuration information of a codebook subset restriction for the quantity X of antenna ports, where the configuration information of the codebook subset restriction for the quantity X of antenna ports includes first configuration information and second configuration information; the first configuration information is configuration information of a codebook subset restriction for a quantity X3 of antenna ports; and the second configuration information is configuration information of a codebook subset restriction for a quantity X4 of antenna ports, where the X3 antenna ports and the X4 antenna ports are corresponding to different polarization directions, X=X3+X4, X3=X4, and X is a positive integer greater than or equal to 2.

In this embodiment, the X antennas are divided into two groups according to a polarization direction of an antenna: A polarization direction of one group of antenna ports is a vertical polarization direction, and a polarization direction of the other group of antenna ports is a horizontal polarization direction. In this embodiment, when a polarization direction of the X3 antenna ports is the vertical polarization direction, a polarization direction of the X4 antenna ports is the horizontal polarization direction; or when a polarization direction of the X3 antenna ports is the horizontal polarization direction, a polarization direction of the X4 antenna ports is the vertical polarization direction.

Step 302: The UE determines, according to the configuration information of the codebook subset restriction for the quantity X of antenna ports, a precoding matrix on which channel measurement and feedback need to be performed.

Specifically, the UE determines, according to the first configuration information and the second configuration information, the precoding matrix on which channel measurement and feedback need to be performed and that is of antenna ports.

Step 303: The UE obtains, by means of measurement according to the reference signal of an antenna port on which channel measurement and feedback need to be performed, the precoding matrix on which channel measurement and feedback need to be performed.

In this embodiment, the configuration information of the codebook subset restriction for the quantity X of antenna ports includes the first configuration information and the second configuration information, where the first configuration information is the configuration information of the codebook subset restriction for the quantity X3 of antenna ports, and the second configuration information is the configuration information of the codebook subset restriction for the quantity X4 of antenna ports. The X3 antenna ports and the X4 antenna ports are corresponding to the different polarization directions, and the precoding matrix on which channel measurement and feedback need to be performed and that is of antenna ports is determined according to the first configuration information and the second configuration information. A codebook whose quantity of antenna ports is X is divided into two codebook subsets according to the polarization direction of the antenna, and configuration information of restrictions on the two codebook subsets is respectively carried in the first configuration information and the second configuration information for feedback, so as to reduce feedback overheads of the configuration information of the codebook subset restriction.

The method in Embodiment 3 is also applicable to configuration information of codebook subset restrictions of antenna ports in a horizontal direction and a vertical direction. Correspondingly, the first configuration information is configuration information of a codebook subset restriction of X5 antenna ports, and the second configuration information is configuration information of a codebook subset restriction of X6 antenna ports, where X1=X5+X6, X5=X6, and the X5 antenna ports and the X6 antenna ports are corresponding to different polarization directions. Alternatively, the first configuration information is configuration information of a codebook subset restriction of X7 antenna ports, and the second configuration information is configuration information of a codebook subset restriction of X8 antenna ports, where X2=X7+X8, X7=X8, and the X7 antenna ports and the X8 antenna ports are corresponding to different polarization directions.

Figure 5:
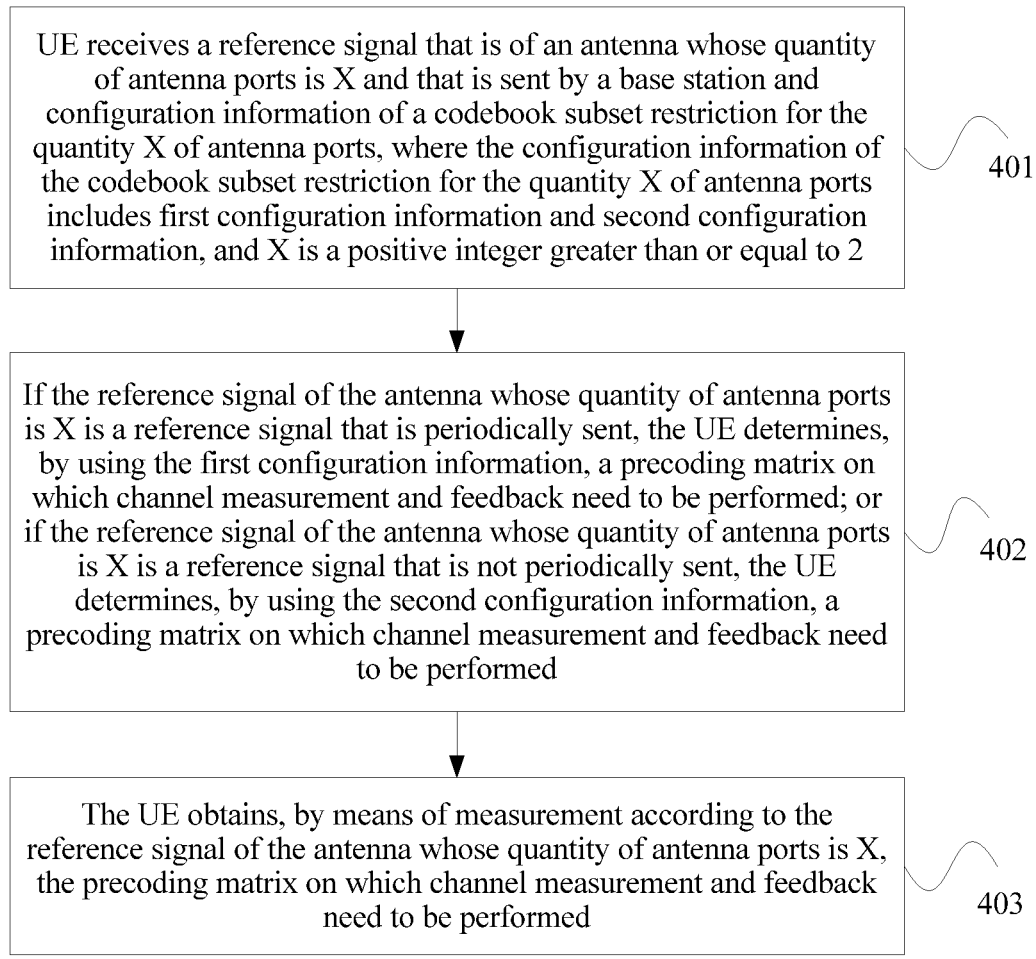
FIG. 5 is a flowchart of a codebook configuration method according to Embodiment 4 of the present invention.

FIG. 5 is a flowchart of a codebook configuration method according to Embodiment 4 of the present invention. As shown in FIG. 5, the method provided in this embodiment may include the following steps.

Step 401: UE receives a reference signal that is of an antenna whose quantity of antenna ports is X and that is sent by a base station and configuration information of a codebook subset restriction for the quantity X of antenna ports, where the configuration information of the codebook subset restriction for the quantity X of antenna ports includes first configuration information and second configuration information, and X is a positive integer greater than or equal to 2.

In this embodiment, different codebook subset configuration information is used for a reference signal that is periodically transmitted and a reference signal that is not periodically transmitted, and the first configuration information and the second configuration information are corresponding to different codebook subset configuration information.

Optionally, both the first configuration information and the second configuration information are sent by using higher layer signaling; or the first configuration information is sent by using higher layer signaling, and the second configuration information is sent by using dynamic signaling; or the first configuration information is sent by using dynamic signaling, and the second configuration information is sent by using higher layer signaling.

Step 402: If the reference signal of the antenna whose quantity of antenna ports is X is a reference signal that is periodically sent, the UE determines, by using the first configuration information, a precoding matrix on which channel measurement and feedback need to be performed; or if the reference signal of the antenna whose quantity of antenna ports is X is a reference signal that is not periodically sent, the UE determines, by using the second configuration information, a precoding matrix on which channel measurement and feedback need to be performed.

The reference signal may be a CSI-RS signal, and the CSI-RS includes two configurations: a configuration 0 and a configuration 1, where the configuration 0 indicates that the CSI-RS is a periodic signal, and the configuration 1 indicates that the CSI-RS is an aperiodic signal. For example, a vertical beam direction corresponding to each antenna port on which the periodic CSI-RS is sent is B1. For example, B1 points to a direction of 10 degrees below a horizontal line, and a sending moment of the periodic CSI-RS sent by the base station is 0 ms, 5 ms, and 10 ms. According to the first configuration information, the UE determines that an enabled codebook set is {C0}.

The base station sends the aperiodic CSI-RS at another time other than 0 ms, 5 ms, and 10 ms, for example, the base station sends the aperiodic CSI-RS at 7 ms. A vertical beam direction corresponding to each antenna port on which the aperiodic CSI-RS is sent is B2. For example, B2 points to a direction of 20 degrees below the horizontal line. The UE determines an enabled codebook set {C1} according to the second configuration information. In this embodiment, the base station may use two bits to instruct the UE to select an enabled codebook set. For example, 00 is used to represent the enabled codebook set {C0}, 01 is used to represent the enabled codebook set {C1}, 10 is used to represent an enabled codebook set {C2}, and 11 is used to represent an enabled codebook set {C3}. If there are more enabled codebook sets, more bits are needed. For example, if there are eight enabled codebook sets, three bits are needed for instruction.

Step 403: The UE obtains, by means of measurement according to the reference signal of the antenna whose quantity of antenna ports is X, the precoding matrix on which channel measurement and feedback need to be performed.

In this embodiment, the different codebook subset configuration information is used for the reference signal that is periodically transmitted and the reference signal that is not periodically transmitted. If the reference signal is the reference signal that is periodically sent, the UE determines, by using the first configuration information, the precoding matrix on which channel measurement and feedback need to be performed and that is of antenna ports; or if the reference signal is the reference signal that is not periodically sent, the UE determines, by using the second configuration information, the precoding matrix on which channel measurement and feedback need to be performed and that is of antenna ports. In the method, the reference signal is divided into two codebook subsets according to periodicity of the reference signal, and configuration information of restrictions on the two codebook subsets is respectively fed back by using the first configuration information and the second configuration information, so as to reduce feedback overheads of the configuration information of the codebook subset restriction.

Embodiment 5 of the present invention provides a codebook configuration method. In this embodiment, a precoding matrix included in a codebook whose quantity of antenna ports is X is represented by a double codebook, and may be specifically represented as $W=W_1(k,l)*W_2$, where $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1(k,l) = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} \ X_V^{l'+1} \ \ldots \ X_V^{l'+N_V^b-1}]$, l=0, ..., L, l'=f(l), $\tilde{X}_H^k = [X_H^{k'} \ X_H^{k'+1} \ \ldots \ X_H^{k'+N_H^b-1}]$, k=0, ..., K, k'=f(k), and $\otimes$ represents a Kronecker product.

$\tilde{X}_H^k$ is corresponding to a precoding matrix in a horizontal direction, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; $N_V^b$ is a quantity of vectors in a beam group in the vertical direction; and $W_2$ is a matrix whose dimension includes X rows and is used to perform column selection on $W_1(k,l)$ and phase adjustment between two groups of antennas.

In this embodiment, $\tilde{X}_H^k \otimes \tilde{X}_V^l$ may be represented as:

$$\tilde{X}_H^k \otimes \tilde{X}_V^l = [X_H^k \otimes X_V^l \; X_H^k \otimes X_V^{l+1} \; \ldots$$
$$X_H^k \otimes X_V^{l+N_V^b-1} \; X_H^{k+1} \otimes X_V^l \; \ldots \; X_H^{k+N_H^b-1} \otimes X_V^{l+N_V^b-1}], \text{ where}$$
$$X^l = [1 \; e^{j2\pi \frac{l}{NQ}} \; \ldots \; e^{j2\pi \frac{(N-1)l}{NQ}}]^T.$$

Correspondingly, the first configuration information is configuration information of a codebook subset restriction corresponding to $W_1(k,l)$ and the second configuration information is configuration information of a codebook subset restriction corresponding to $W_2$. Alternatively, the first configuration information includes fifth sub-configuration information and sixth sub-configuration information, where the fifth sub-configuration information is configuration information of a codebook subset restriction corresponding to $\tilde{X}_V^l$, and the sixth sub-configuration information is configuration information of a codebook subset restriction corresponding to $\tilde{X}_V^l$, and the second configuration information is configuration information of a codebook subset restriction corresponding to $W_2$.

Alternatively, a precoding matrix included in a codebook whose quantity of antenna ports is X is represented as $W=W_1(k,l)*W_2*W_3$. In this case, $W_2$ is a column selection matrix whose dimension includes X rows and is used to perform column selection on $W_1(k,l)$; and $W_3$ is a phase adjustment matrix, and $W_3$ is used to perform phase adjustment between two groups of antennas. Correspondingly, the first configuration information is configuration information of a codebook subset restriction corresponding to $W_1(k,l)$, and the second configuration information is configuration information of a codebook subset restriction corresponding to $W_2$ and configuration information of a codebook subset restriction corresponding to $W_3$. Alternatively, the first configuration information includes fifth sub-configuration information and sixth sub-configuration information, where the fifth sub-configuration information is configuration information of a codebook subset restriction corresponding to $\tilde{X}_H^k$, and the sixth sub-configuration information is configuration information of a codebook subset restriction corresponding to $\tilde{X}_V^l$ and the second configuration information is configuration information of a codebook subset restriction corresponding to $W_2$ and configuration information of a codebook subset restriction corresponding to $W_3$.

Figure 6:
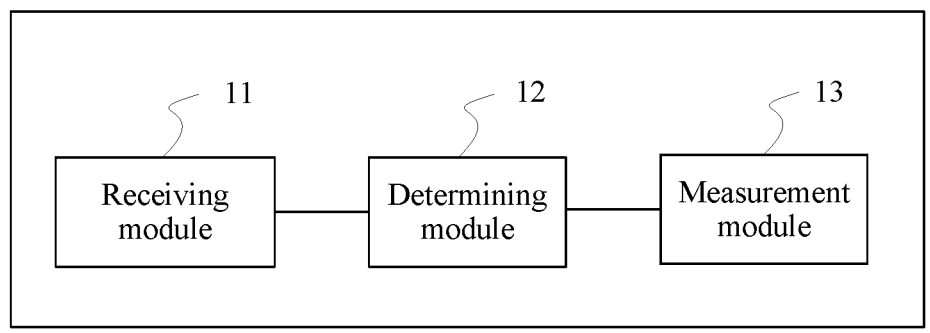
FIG. 6 is a schematic structural diagram of UE according to Embodiment 6 of the present invention.

FIG. 6 is a schematic structural diagram of UE according to Embodiment 6 of the present invention. As shown in FIG. 6, the UE provided in this embodiment includes a receiving module 11, a determining module 12, and a measurement module 13.

The receiving module 11 is configured to receive a reference signal that is of an antenna whose quantity of antenna ports is X and that is sent by a base station and configuration information of a codebook subset restriction for the quantity X of antenna ports, where the configuration information of the codebook subset restriction for the quantity X of antenna ports includes first configuration information and second configuration information, and X is a positive integer greater than or equal to 2.

The determining module 12 is configured to determine, according to the configuration information of the codebook subset restriction for the quantity X of antenna ports, a precoding matrix on which channel measurement and feedback need to be performed, where the codebook subset restriction for the quantity X of antenna ports is used to instruct the UE to select some precoding matrices from all precoding matrices in a codebook whose quantity of antenna ports is X for measurement and feedback.

The measurement module 13 is configured to obtain, by means of measurement according to the reference signal of the antenna whose quantity of antenna ports is X, the precoding matrix on which channel measurement and feedback need to be performed.

Optionally, the first configuration information is configuration information of a codebook subset restriction for a quantity X1 of antenna ports, and the second configuration is configuration information of a codebook subset restriction for a quantity X2 of antenna ports, where $X=X1 \times X2$.

Optionally, the first configuration information is configuration information of a codebook subset restriction for a quantity X1 of antenna ports, and the second configuration is configuration information of a codebook subset restriction for a quantity X2 of antenna ports, where $X=X1 \times X2 \times 2$.

Correspondingly, the determining module 12 is specifically configured to perform a Kronecker product on a precoding matrix whose quantity of antenna ports is X1 and a precoding matrix whose quantity of antenna ports is X2 to obtain the precoding matrix on which channel measurement and feedback need to be performed and that is of antenna ports. That the determining module 12 performs a Kronecker product on a precoding matrix whose quantity of antenna ports is X1 and a precoding matrix whose quantity of antenna ports is X2 to obtain the precoding matrix on which channel measurement and feedback need to be performed and that is of antenna ports is specifically:

performing the Kronecker product on the precoding matrix whose quantity of antenna ports is X1 and the precoding matrix whose quantity of antenna ports is X2 to obtain $W_1$ of a precoding matrix whose quantity of antenna ports is X; and obtaining, according to a formula $W=W_1*W_2$, the precoding matrix on which channel measurement and feedback need to be performed and that is of antenna ports, where $W_2$ is a matrix whose dimension includes X rows and is used to perform column selection and/or phase adjustment on $W_1$.

$$W_1 = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1 = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} \; X_V^{l'+1} \; \ldots \; X_V^{l'+N_V^b-1}]$, $l=0, \ldots, L, l'=f(l)$, $\tilde{X}_H^k = [X_H^{k'} \; X_H^{k'+1} \; \ldots \; X_H^{k'+N_H^b-1}]$, $k=0, \ldots, K, k'=f(k)$, and $\otimes$ represents a Kronecker product.

$\tilde{X}_H^k$ is corresponding to a precoding matrix in a horizontal direction in $W_1$, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction in W1, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; and $N_V^b$ is a quantity of vectors in a beam group in the vertical direction; and the first configuration information is configuration information of a codebook subset restriction corresponding to $\tilde{X}_H^k$, and the second configuration information is configuration information of a codebook subset restriction corresponding to $\tilde{X}_V^l$.

Optionally, both the first configuration information and the second configuration information are sent by using higher layer signaling; or the first configuration information is sent by using higher layer signaling, and the second configuration information is sent by using dynamic signaling; or both the first configuration information and the second configuration information are sent by using higher layer signaling.

Optionally, configuration information of a codebook subset restriction of antenna ports for a larger quantity of antenna ports in X1 and X2 is configured by using dynamic signaling, and configuration information of a codebook subset restriction of antenna ports for a smaller quantity of antenna ports in X1 and X2 is configured by using higher layer signaling; or configuration information of a codebook subset restriction of antenna ports for a larger quantity of antenna ports in X1 and X2 is configured by using higher layer signaling, and configuration information of a codebook subset restriction of antenna ports for a smaller quantity of antenna ports in X1 and X2 is configured by using dynamic signaling.

Optionally, a precoding matrix in a codebook whose quantity of antenna ports is X1 is represented as $W^a = W_1^a \cdot W_2^a$, where $$W_1^a = \begin{bmatrix} \tilde{X}_H^k & 0 \\ 0 & \tilde{X}_H^k \end{bmatrix},$$

$\tilde{X}_H^k = [X_H^{k'} \ X_H^{k'+1} \ \ldots \ X_H^{k'+N_H^b-1}]$, $k=0, \ldots, K, k'=f(k)$, and $\otimes$ represents a Kronecker product.

$W_1^a$ is corresponding to a first precoding matrix that is in a double codebook structure and of the X1 antenna ports in a horizontal direction of the antenna whose quantity of antenna ports is X; $\tilde{X}_H^k$ is corresponding to a matrix in a diagonal position in the first precoding matrix that is in the double codebook structure and of the X1 antenna ports, $\tilde{X}_H^k$ is corresponding to a beam group, each beam is corresponding to a DFT vector, $\tilde{X}_H^k$ is a set that includes at least two column vectors, each column vector of $\tilde{X}_H^k$ is a DFT vector, and a dimension of each column vector of $\tilde{X}_H^k$ is X1/2; K is a total quantity of beam groups corresponding to the X1 antenna ports in the horizontal direction; $N_H^b$ is a quantity of vectors in a beam group corresponding to the X1 antenna ports in the horizontal direction; and $W_2^a$ is corresponding to a second precoding matrix that is in the double codebook structure and of the X1 antenna ports in the horizontal direction of the antenna whose quantity of antenna ports is X, and $W_2^a$ is a matrix whose dimension includes X1 rows and is used to perform column selection and/or phase adjustment on $W_1^a$. Correspondingly, the first configuration information includes first sub-configuration information and second sub-configuration information, where the first sub-configuration information is configuration information of a codebook subset restriction corresponding to $W_1^a$, and the second sub-configuration information is configuration information of a codebook subset restriction corresponding to $W_2^a$. Alternatively, the first configuration information is configuration information of a codebook subset restriction corresponding to $\tilde{X}_H^k$.

The first sub-configuration information is sent by using higher layer signaling, and the second sub-configuration information is sent by using dynamic signaling; or the first sub-configuration information is sent by using dynamic signaling, and the second sub-configuration information is sent by using higher layer signaling.

Optionally, a precoding matrix in a codebook whose quantity of antenna ports is X2 is represented as $W^b = W_1^b \cdot W_2^b$, where $$W_1^b = \begin{bmatrix} \tilde{X}_V^l & 0 \\ 0 & \tilde{X}_V^l \end{bmatrix},$$

$\tilde{X}_V^l = [X_V^{l'} \ X_V^{l'+1} \ \ldots \ X_V^{l'+N_V^b-1}]$, $l=0, \ldots, L, l'=f(l)$, and $\otimes$ represents a Kronecker product.

$W_1^b$ is corresponding to a first precoding matrix that is in a double codebook structure and of the X2 antenna ports in a vertical direction of the antenna whose quantity of antenna ports is X; $\tilde{X}_V^l$ is corresponding to a matrix in a diagonal position in the first precoding matrix that is in the double codebook structure and of the X2 antenna ports, $\tilde{X}_V^l$ is corresponding to a beam group, each beam is corresponding to a DFT vector, $\tilde{X}_V^l$ is a set that includes at least two column vectors, each column vector of $\tilde{X}_V^l$ is a DFT vector, and a dimension of each column vector of $\tilde{X}_V^l$ is X2/2; L is a total quantity of beam groups corresponding to the X2 antenna ports in the vertical direction; $N_V^b$ is a quantity of vectors in a beam group corresponding to the X2 antenna ports in the vertical direction; and $W_2^b$ is corresponding to a second precoding matrix that is in the double codebook structure and of the X2 antenna ports in the vertical direction of the antenna whose quantity of antenna ports is X, and $W_2^b$ is a matrix whose dimension includes X2 rows and is used to perform column selection and/or phase adjustment on $W_1^b$. Correspondingly, the second configuration information includes third sub-configuration information and fourth sub-configuration information, where the third sub-configuration information is configuration information of a codebook subset restriction corresponding to $W_1^b$, and the fourth sub-configuration information is configuration information of a codebook subset restriction corresponding to $W_2^b$. Alternatively, the second configuration information is configuration information of a codebook subset restriction corresponding to $\tilde{X}_V^l$.

The third sub-configuration information is sent by using higher layer signaling, and the fourth sub-configuration information is sent by using dynamic signaling; or the third sub-configuration information is sent by using dynamic signaling, and the fourth sub-configuration information is sent by using higher layer signaling.

Optionally, the antenna whose quantity of antenna ports is X is an antenna array with at least two rows and two columns. The X1 antenna ports are in a same horizontal dimension, and the X2 antenna ports are in a same vertical dimension. Alternatively, X1 is a quantity of columns of the antenna whose quantity of antenna ports is X, and X2 is a quantity of rows of the antenna whose quantity of antenna ports is X; or X1 is half of a quantity of columns of the antenna whose quantity of antenna ports is X, and X2 is a quantity of rows of the antenna whose quantity of antenna ports is X; or X1 is a quantity of columns of the antenna whose quantity of antenna ports is X, and X2 is half of a quantity of rows of the antenna whose quantity of antenna ports is X.

Optionally, the reference signal is a channel state information-reference signal CSI-RS.

Optionally, the dynamic signaling is DL grant signaling or UL grant signaling.

The UE provided in this embodiment may be configured to perform the method in Embodiment 1. A specific implementation and a technical effect are similar to those of the method in Embodiment 1, and details are not described herein again.

Embodiment 7 of the present invention provides UE. For a structure of the UE in this embodiment, refer to FIG. 6. In this embodiment, the first configuration information is enabling restriction information of a codebook group obtained after all the precoding matrices in the codebook whose quantity of antenna ports is X are grouped, and grouping of all the precoding matrices in the codebook whose quantity of antenna ports is X is predefined; and the second configuration information is enabling restriction information of a precoding matrix in each codebook group.

Alternatively, the first configuration information is enabling restriction information of a codebook group obtained after all precoding matrices in a codebook whose quantity of antenna ports is X1 are grouped, and grouping of all the precoding matrices in the codebook whose quantity of antenna ports is X1 is predefined; and the second configuration information is enabling restriction information of a precoding matrix in each codebook group.

Alternatively, the first configuration information is enabling restriction information of a codebook group obtained after all precoding matrices in a codebook whose quantity of antenna ports is X2 are grouped, and grouping of all the precoding matrices in the codebook whose quantity of antenna ports is X2 is predefined; and the second configuration information is enabling restriction information of a precoding matrix in each codebook group.

Optionally, both the first configuration information and the second configuration information are sent by using higher layer signaling; or the first configuration information is sent by using higher layer signaling, and the second configuration information is sent by using dynamic signaling; or the first configuration information is sent by using dynamic signaling, and the second configuration information is sent by using higher layer signaling.

The UE in this embodiment may be configured to perform the method in Embodiment 2. A specific implementation and a technical effect are similar to those of the method in Embodiment 2, and details are not described herein again.

Embodiment 8 of the present invention provides UE. For a structure of the UE in this embodiment, refer to FIG. 6. In this embodiment, the first configuration information is configuration information of a codebook subset restriction for a quantity X3 of antenna ports, and the second configuration information is configuration information of a codebook subset restriction for a quantity X4 of antenna ports, where X=X3+X4, X3=X4, and the X3 antenna ports and the X4 antenna ports are corresponding to different polarization directions.

Alternatively, the first configuration information is configuration information of a codebook subset restriction of X5 antenna ports, and the second configuration information is configuration information of a codebook subset restriction of X6 antenna ports, where X1=X5+X6, X5=X6, and the X5 antenna ports and the X6 antenna ports are corresponding to different polarization directions.

Alternatively, the first configuration information is configuration information of a codebook subset restriction of X7 antenna ports, and the second configuration information is configuration information of a codebook subset restriction of X8 antenna ports, where X2=X7+X8, X7=X8, and the X7 antenna ports and the X8 antenna ports are corresponding to different polarization directions.

The UE in this embodiment may be configured to perform the method in Embodiment 3. A specific implementation and a technical effect are similar to those of the method in Embodiment 3, and details are not described herein again.

Embodiment 9 of the present invention provides UE. For a structure of the UE in this embodiment, refer to FIG. 6. In this embodiment, if the reference signal of the antenna whose quantity of antenna ports is X is a reference signal that is periodically sent, the determining module 12 is specifically configured to determine, by using the first configuration information, the precoding matrix on which channel measurement and feedback need to be performed and that is of antenna ports; or if the reference signal of the antenna whose quantity of antenna ports is X is a reference signal that is not periodically sent, the determining module 12 is specifically configured to determine, by using the second configuration information, the precoding matrix on which channel measurement and feedback need to be performed and that is of antenna ports.

Optionally, both the first configuration information and the second configuration information are sent by using higher layer signaling; or the first configuration information is sent by using higher layer signaling, and the second configuration information is sent by using dynamic signaling; or the first configuration information is sent by using dynamic signaling, and the second configuration information is sent by using higher layer signaling.

The UE provided in this embodiment may be configured to perform the method in Embodiment 4. A specific implementation and a technical effect are similar to those of the method in Embodiment 4, and details are not described herein again.

Embodiment 10 of the present invention provides UE. For a structure of the UE in this embodiment, refer to FIG. 6. In this embodiment, a precoding matrix included in the codebook whose quantity of antenna ports is X is represented as $W=W_1(k,l)*W_2$, where $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1(k,l) = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} \; X_V^{l'+1} \; \ldots \; X_V^{l'+N_V^p-1}]$, l=0, . . . , L,l'=f(l), $\tilde{X}_H^k = [X_H^{k'} \; X_H^{k'+1} \; \ldots \; X_H^{k'+N_H^p-1}]$, k=0, . . . , K,k'=f(k), and $\otimes$ represents a Kronecker product.

$\tilde{X}_H^k$ corresponding to a precoding matrix in a horizontal direction, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; $N_V^b$ is a quantity of vectors in a beam group in the vertical direction; and $W_2$ is a matrix whose dimension includes X rows and is used to perform column selection and/or phase adjustment on $W_1(k,l)$. Correspondingly, the first configuration information is configuration information of a codebook subset restriction corresponding to $W_1(k,l)$, and the second configuration information is configuration information of a codebook subset restriction corresponding to $W_2$. Alternatively, the first configuration information includes fifth sub-configuration information and sixth sub-configuration information, where the fifth sub-configuration information is configuration information of a codebook subset restriction corresponding to $\tilde{X}_H^k$, and the sixth sub-configuration information is configuration information of a codebook subset restriction corresponding to $\tilde{X}_V^l$, and the second configuration information is configuration information of a codebook subset restriction corresponding to $W_2$.

Alternatively, a precoding matrix included in the codebook whose quantity of antenna ports is X may be represented as $W=W_1(k,l)*W_2*W_3$, where $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1(k,l) = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} X_V^{l'+1} \ldots X_V^{l'+N_V^b-1}]$, l=0, ..., L, l'=f(l), $\tilde{X}_H^k = [X_H^{k'} X_H^{k'+1} \ldots X_H^{k'+N_H^b-1}]$, k=0, ..., K, k'=f(k), and $\otimes$ represents a Kronecker product.

$\tilde{X}_H^k$ is corresponding to a precoding matrix in a horizontal direction, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction in W1, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$, is a quantity of co-polarized antennas in the vertical direction; L is a quantity of beam groups in the vertical direction; $N_V^b$ is a quantity of vectors in a beam group in the vertical direction; $W_2$ is a column selection matrix whose dimension includes X rows and is used to perform column selection on $W_1(k,l)$; and $W_3$ is a phase adjustment matrix, and $W_3$ is used to perform phase adjustment between two groups of antennas.

Correspondingly, the first configuration information is configuration information of a codebook subset restriction corresponding to $W_1(k,l)$, and the second configuration information is configuration information of a codebook subset restriction corresponding to $W_2$ and configuration information of a codebook subset restriction corresponding to $W_3$. Alternatively, the first configuration information includes fifth sub-configuration information and sixth sub-configuration information, where the fifth sub-configuration information is configuration information of a codebook subset restriction corresponding to $\tilde{X}_H^k$, and the sixth sub-configuration information is configuration information of a codebook subset restriction corresponding to $\tilde{X}_V^l$, and the second configuration information is configuration information of a codebook subset restriction corresponding to $W_2$ and configuration information of a codebook subset restriction corresponding to $W_3$.

The UE in this embodiment may be configured to perform the method in Embodiment 5. A specific implementation and a technical effect are similar to those of the method in Embodiment 5, and details are not described herein again.

Figure 7:
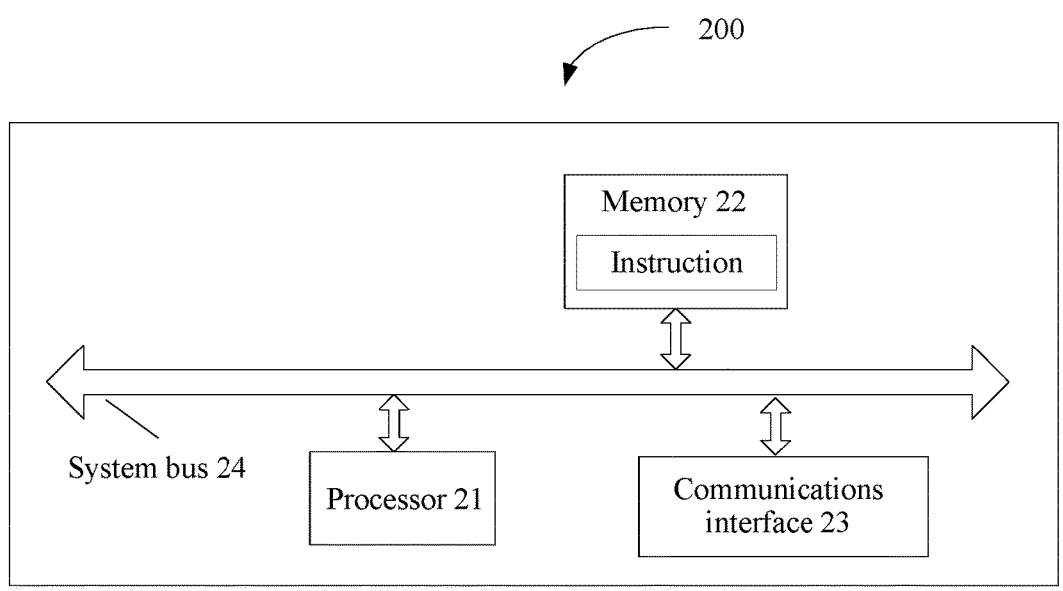
FIG. 7 is a schematic structural diagram of UE according to Embodiment 11 of the present invention.

Embodiment 11 of the present invention provides UE. FIG. 7 is a schematic structural diagram of the UE according to Embodiment 11 of the present invention. As shown in FIG. 7, the UE 200 provided in this embodiment includes a processor 21, a memory 22, a communications interface 23, and a system bus 24. The memory 22, the communications interface 23, and the processor 21 are connected and communicate with each other by using the system bus 24; the memory 22 is configured to store a computer execution instruction; the communications interface 23 is configured to communicate with another device; and the processor 21 is configured to run the computer execution instruction, so that the UE performs the following method:

receiving a reference signal that is of an antenna whose quantity of antenna ports is X and that is sent by a base station and configuration information of a codebook subset restriction for the quantity X of antenna ports, where the configuration information of the codebook subset restriction for the quantity X of antenna ports includes first configuration information and second configuration information, and X is a positive integer greater than or equal to 2;

determining, according to the configuration information of the codebook subset restriction for the quantity X of antenna ports, a precoding matrix on which channel measurement and feedback need to be performed, where the codebook subset restriction for the quantity X of antenna ports is used to instruct the UE to select some precoding matrices from all precoding matrices in a codebook whose quantity of antenna ports is X for measurement and feedback; and obtaining, by means of measurement according to the reference signal of the antenna whose quantity of antenna ports is X, the precoding matrix on which channel measurement and feedback need to be performed.

Optionally, the first configuration information is configuration information of a codebook subset restriction for a quantity X1 of antenna ports, and the second configuration is configuration information of a codebook subset restriction for a quantity X2 of antenna ports, where X=X1×X2.

Optionally, the first configuration information is configuration information of a codebook subset restriction for a quantity X1 of antenna ports, and the second configuration is configuration information of a codebook subset restriction for a quantity X2 of antenna ports, where X=X1×X2×2.

Correspondingly, that the processor 21 determines, according to the configuration information of the codebook subset restriction for the quantity X of antenna ports, a precoding matrix on which channel measurement and feedback need to be performed is specifically:

performing a Kronecker product on a precoding matrix whose quantity of antenna ports is X1 and a precoding matrix whose quantity of antenna ports is X2 to obtain the precoding matrix on which channel measurement and feedback need to be performed and that is of antenna ports; or performing a Kronecker product on a precoding matrix whose quantity of antenna ports is X1 and a precoding matrix whose quantity of antenna ports is X2 to obtain $W_1$ of a precoding matrix whose quantity of antenna ports is X; and then obtaining, according to a formula $W=W_1*W_2$, the precoding matrix on which channel measurement and feedback need to be performed and that is of antenna ports, where $W_2$ is a matrix whose dimension includes X rows and is used to perform column selection and/or phase adjustment on $W_1$.

$$W_1 = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1 = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} X_V^{l'+1} \ldots X_V^{l'+N_V^b-1}]$, l=0, ..., L, l'=f(l), $\tilde{X}_H^k = [X_H^{k'} X_H^{k'+1} \ldots X_H^{k'+N_H^b-1}]$, k=0, ..., K, k'=f(k), and $\otimes$ represents a Kronecker product.

$\tilde{X}_H^k$ is corresponding to a precoding matrix in a horizontal direction in $W_1$, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction in W1, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; and $N_V^b$ is a quantity of vectors in a beam group in the vertical direction. Correspondingly, the first configuration information is configuration information of a codebook subset restriction corresponding to $\tilde{X}_H^k$, and the second configuration information is configuration information of a codebook subset restriction corresponding to $\tilde{X}_V^l$.

Optionally, a precoding matrix included in the codebook whose quantity of antenna ports is X is represented as $W=W_1(k,l)*W_2$, where $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1(k,l) = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} X_V^{l'+1} \ldots X_V^{l'+N_V^b-1}]$, l=0, ..., L, l'=f(l), $\tilde{X}_H^k = [X_H^{k'} X_H^{k'+1} \ldots X_H^{k'+N_H^b-1}]$, k=0, ..., K, k'=f(k), and $\otimes$ represents a Kronecker product.

$\tilde{X}_H^k$ is corresponding to a precoding matrix in a horizontal direction, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; $N_V^b$ is a quantity of vectors in a beam group in the vertical direction; and $W_2$ is a matrix whose dimension includes X rows and is used to perform column selection and/or phase adjustment on $W_1(k,l)$.

Correspondingly, the first configuration information is configuration information of a codebook subset restriction corresponding to $W_1(k,l)$, and the second configuration information is configuration information of a codebook subset restriction corresponding to $W_2$. Alternatively, the first configuration information includes fifth sub-configuration information and sixth sub-configuration information, where the fifth sub-configuration information is configuration information of a codebook subset restriction corresponding to $\tilde{X}_H^k$, and the sixth sub-configuration information is configuration information of a codebook subset restriction corresponding to $\tilde{X}_V^l$, and the second configuration information is configuration information of a codebook subset restriction corresponding to $W_2$.

Optionally, both the first configuration information and the second configuration information are sent by using higher layer signaling; or the first configuration information is sent by using higher layer signaling, and the second configuration information is sent by using dynamic signaling; or both the first configuration information and the second configuration information are sent by using higher layer signaling.

Optionally, configuration information of a codebook subset restriction of antenna ports for a larger quantity of antenna ports in X1 and X2 is configured by using dynamic signaling, and configuration information of a codebook subset restriction of antenna ports for a smaller quantity of antenna ports in X1 and X2 is configured by using higher layer signaling; or configuration information of a codebook subset restriction of antenna ports for a larger quantity of antenna ports in X1 and X2 is configured by using higher layer signaling, and configuration information of a codebook subset restriction of antenna ports for a smaller quantity of antenna ports in X1 and X2 is configured by using dynamic signaling.

Optionally, a precoding matrix in a codebook whose quantity of antenna ports is X1 is represented as $W^a = W_1^a \cdot W_2^a$, where $$W_1^a = \begin{bmatrix} \tilde{X}_H^k & 0 \\ 0 & \tilde{X}_H^k \end{bmatrix},$$

$\tilde{X}_H^k = [X_H^{k'} X_H^{k'+1} \ldots X_H^{k'+N_H^b-1}]$, k=0, ..., K, k'=f(k), and $\otimes$ represents a Kronecker product.

$W_1^a$ is corresponding to a first precoding matrix that is in a double codebook structure and of the X1 antenna ports in a horizontal direction of the antenna whose quantity of antenna ports is X; $\tilde{X}_H^k$ is corresponding to a matrix in a diagonal position in the first precoding matrix that is in the double codebook structure and of the X1 antenna ports, $\tilde{X}_H^k$ is corresponding to a beam group, each beam is corresponding to a DFT vector, $\tilde{X}_H^k$ is a set that includes at least two column vectors, each column vector of $\tilde{X}_H^k$ is a DFT vector, and a dimension of each column vector of $\tilde{X}_H^k$ is X1/2; K is a total quantity of beam groups corresponding to the X1 antenna ports in the horizontal direction; $N_H^b$ is a quantity of vectors in a beam group corresponding to the X1 antenna ports in the horizontal direction; and $W_2^a$ is corresponding to a second precoding matrix that is in the double codebook structure and of the X1 antenna ports in the horizontal direction of the antenna whose quantity of antenna ports is X, and $W_2^a$ is a matrix whose dimension includes X1 rows and is used to perform column selection and/or phase adjustment on $W_1^a$. Correspondingly, the first configuration information includes first sub-configuration information and second sub-configuration information, where the first sub-configuration information is configuration information of a codebook subset restriction corresponding to $W_1^a$, and the second sub-configuration information is configuration information of a codebook subset restriction corresponding to $W_2^a$. Alternatively, the first configuration information is configuration information of a codebook subset restriction corresponding to $\tilde{X}_H^k$.

Optionally, the first sub-configuration information is sent by using higher layer signaling, and the second sub-configuration information is sent by using dynamic signaling; or the first sub-configuration information is sent by using dynamic signaling, and the second sub-configuration information is sent by using higher layer signaling.

Optionally, a precoding matrix in a codebook whose quantity of antenna ports is X2 is represented as $W^b = W_1^b \cdot W_2^b$, where $$W_1^b = \begin{bmatrix} \tilde{X}_V^l & 0 \\ 0 & \tilde{X}_V^l \end{bmatrix},$$

$\tilde{X}_V^l = [X_V^{l'} \ X_V^{l'+1} \ \ldots \ X_V^{l'+N_V^b-1}]$, l=0, ..., L, l'=f(l), and $\otimes$ represents a Kronecker product.

$W_1^b$ is corresponding to a first precoding matrix that is in a double codebook structure and of the X2 antenna ports in a vertical direction of the antenna whose quantity of antenna ports is X; $\tilde{X}_V^l$ is corresponding to a matrix in a diagonal position in the first precoding matrix that is in the double codebook structure and of the X2 antenna ports, $\tilde{X}_V^l$ is corresponding to a beam group, each beam is corresponding to a DFT vector, $\tilde{X}_V^l$ is a set that includes at least two column vectors, each column vector of $\tilde{X}_V^l$ is a DFT vector, and a dimension of each column vector of $\tilde{X}_V^l$ is X2/2; L is a total quantity of beam groups corresponding to the X2 antenna ports in the vertical direction; $N_V^b$ is a quantity of vectors in a beam group corresponding to the X2 antenna ports in the vertical direction; and $W_2^b$ is corresponding to a second precoding matrix that is in the double codebook structure and of the X2 antenna ports in the vertical direction of the antenna whose quantity of antenna ports is X, and $W_2^b$ is a matrix whose dimension includes X2 rows and is used to perform column selection and/or phase adjustment on $W_1^b$. Correspondingly, the second configuration information includes third sub-configuration information and fourth sub-configuration information, where the third sub-configuration information is configuration information of a codebook subset restriction corresponding to $W_1^b$, and the fourth sub-configuration information is configuration information of a codebook subset restriction corresponding to $W_2^b$. Alternatively, the second configuration information is configuration information of a codebook subset restriction corresponding to $\tilde{X}_V^l$.

Optionally, the third sub-configuration information is sent by using higher layer signaling, and the fourth sub-configuration information is sent by using dynamic signaling; or the third sub-configuration information is sent by using dynamic signaling, and the fourth sub-configuration information is sent by using higher layer signaling.

The antenna whose quantity of antenna ports is X is an antenna array with at least two rows and two columns. The X1 antenna ports are in a same horizontal dimension, and the X2 antenna ports are in a same vertical dimension. Alternatively, X1 is a quantity of columns of the antenna whose quantity of antenna ports is X, and X2 is a quantity of rows of the antenna whose quantity of antenna ports is X; or X1 is half of a quantity of columns of the antenna whose quantity of antenna ports is X, and X2 is a quantity of rows of the antenna whose quantity of antenna ports is X; or X1 is a quantity of columns of the antenna whose quantity of antenna ports is X, and X2 is half of a quantity of rows of the antenna whose quantity of antenna ports is X.

Optionally, the first configuration information is enabling restriction information of a codebook group obtained after all the precoding matrices in the codebook whose quantity of antenna ports is X are grouped, and grouping of all the precoding matrices in the codebook whose quantity of antenna ports is X is predefined; and the second configuration information is enabling restriction information of a precoding matrix in each codebook group.

Optionally, the first configuration information is enabling restriction information of a codebook group obtained after all precoding matrices in a codebook whose quantity of antenna ports is X1 are grouped, and grouping of all the precoding matrices in the codebook whose quantity of antenna ports is X1 is predefined; and the second configuration information is enabling restriction information of a precoding matrix in each codebook group. Alternatively, the first configuration information is enabling restriction information of a codebook group obtained after all precoding matrices in a codebook whose quantity of antenna ports is X2 are grouped, and grouping of all the precoding matrices in the codebook whose quantity of antenna ports is X2 is predefined; and the second configuration information is enabling restriction information of a precoding matrix in each codebook group.

Optionally, the first configuration information is configuration information of a codebook subset restriction for a quantity X3 of antenna ports, and the second configuration information is configuration information of a codebook subset restriction for a quantity X4 of antenna ports, where X=X3+X4, X3=X4, and the X3 antenna ports and the X4 antenna ports are corresponding to different polarization directions.

Optionally, the first configuration information is configuration information of a codebook subset restriction of X5 antenna ports, and the second configuration information is configuration information of a codebook subset restriction of X6 antenna ports, where X1=X5+X6, X5=X6, and the X5 antenna ports and the X6 antenna ports are corresponding to different polarization directions. Alternatively, the first configuration information is configuration information of a codebook subset restriction of X7 antenna ports, and the second configuration information is configuration information of a codebook subset restriction of X8 antenna ports, where X2=X7+X8, X7=X8, and the X7 antenna ports and the X8 antenna ports are corresponding to different polarization directions.

Optionally, a precoding matrix included in the codebook whose quantity of antenna ports is X may be represented as $W = W_1(k,l)^* W_2^* W_3$, where $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1(k,l) = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} X_V^{l'+1} \ldots X_V^{l'+N_V^b-1}]$, l=0, ..., L, l'=f(l), $\tilde{X}_H^k = [X_H^{k'} X_H^{k'+1} \ldots X_H^{k'+N_H^b-1}]$, k=0, ..., K, k'=f(k), and $\otimes$ represents a Kronecker product.

$\tilde{X}_H^k$ is corresponding to a precoding matrix in a horizontal direction, $\tilde{X}_H^k$ is corresponding to a beam group, $\tilde{X}_H^k$ is a set that includes at least two column vectors, each column vector of $\tilde{X}_H^k$ is a DFT vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ is corresponding to a precoding matrix in a vertical direction in $W_1$, $\tilde{X}_V^l$ is corresponding to a beam group, $\tilde{X}_V^l$ is a set that includes at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; $N_V^b$ is a quantity of vectors in a beam group in the vertical direction; $W_2$ is a column selection matrix whose dimension includes X rows and is used to perform column selection on $W_1(k,l)$; and $W_3$ is a phase adjustment matrix, and $W_3$ is used to perform phase adjustment between two groups of antennas.

Correspondingly, the first configuration information is configuration information of a codebook subset restriction corresponding to $W_1(k,l)$, and the second configuration information is configuration information of a codebook subset restriction corresponding to $W_2$ and configuration information of a codebook subset restriction corresponding to $W_3$. Alternatively, the first configuration information includes fifth sub-configuration information and sixth sub-configuration information, where the fifth sub-configuration information is configuration information of a codebook subset restriction corresponding to $\tilde{X}_H^k$, and the sixth sub-configuration information is configuration information of a codebook subset restriction corresponding to $\tilde{X}_V^l$, and the second configuration information is configuration information of a codebook subset restriction corresponding to $W_2$ and configuration information of a codebook subset restriction corresponding to $W_3$.

Optionally, if the reference signal of the antenna whose quantity of antenna ports is X is a reference signal that is periodically sent, that the processor 21 determines, according to the configuration information of the codebook subset restriction for the quantity X of antenna ports, a precoding matrix on which channel measurement and feedback need to be performed and that is of antenna ports is specifically: determining, by using the first configuration information, the precoding matrix on which channel measurement and feedback need to be performed and that is of antenna ports.

If the reference signal of the antenna whose quantity of antenna ports is X is a reference signal that is not periodically sent, that the processor 21 determines, according to the configuration information of the codebook subset restriction for the quantity X of antenna ports, a precoding matrix on which channel measurement and feedback need to be performed and that is of antenna ports includes: determining, by using the second configuration information, the precoding matrix on which channel measurement and feedback need to be performed and that is of antenna ports.

Optionally, the reference signal is a channel state information-reference signal CSI-RS.

Optionally, the dynamic signaling is DL grant signaling or UL grant signaling.

The UE in this embodiment may be configured to perform the methods in Embodiment 1 to Embodiment 5. A specific implementation and a technical effect are similar to those of the methods in Embodiment 1 to Embodiment 5, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the present invention.

Additionally, statements made herein characterizing the invention refer to an embodiment of the invention and not necessarily all embodiments.

What is claimed is:

1. A codebook configuration method, comprising:
   receiving, by a user equipment (UE), a reference signal that is of an antenna whose quantity of antenna ports is X and that is sent by a base station and configuration information of a codebook subset restriction for the quantity X of antenna ports, wherein the configuration information of the codebook subset restriction for the quantity X of antenna ports comprises first configuration information and second configuration information, and X is a positive integer greater than or equal to 2;
   determining, by the UE according to the configuration information of the codebook subset restriction for the quantity X of antenna ports, a precoding matrix on which channel measurement and feedback need to be performed, wherein the codebook subset restriction for the quantity X of antenna ports is used to instruct the UE to select some precoding matrices from all precoding matrices in a codebook whose quantity of antenna ports is X for measurement and feedback; and
   obtaining, by the UE via measurement according to the reference signal of the antenna whose quantity of antenna ports is X, the precoding matrix on which channel measurement and feedback need to be performed.

2. The method according to claim 1, wherein the first configuration information is configuration information of a codebook subset restriction for a quantity X1 of antenna ports, and the second configuration information is configuration information of a codebook subset restriction for a quantity X2 of antenna ports, wherein X=X1×X2.

3. The method according to claim 1, wherein the first configuration information is configuration information of a codebook subset restriction for a quantity X1 of antenna ports, and the second configuration information is configuration information of a codebook subset restriction for a quantity X2 of antenna ports, wherein X=X1×X2×2.

4. The method according to claim 2, wherein determining the precoding matrix on which channel measurement and feedback need to be performed comprises:
   performing, by the UE, a Kronecker product on a precoding matrix whose quantity of antenna ports is X1 and a precoding matrix whose quantity of antenna ports is X2 to obtain the precoding matrix on which channel measurement and feedback need to be performed.

5. The method according to claim 4, wherein performing the Kronecker product on the precoding matrix whose quantity of antenna ports is X1 and the precoding matrix whose quantity of antenna ports is X2 to obtain the precoding matrix on which channel measurement and feedback need to be performed comprises:
   performing, by the UE, the Kronecker product on the precoding matrix whose quantity of antenna ports is X1 and the precoding matrix whose quantity of antenna ports is X2 to obtain $W_1$ of a precoding matrix whose quantity of antenna ports is X; and
   obtaining, by the UE according to a formula $W=W_1*W_2$, the precoding matrix on which channel measurement and feedback need to be performed, wherein $W_2$ is a matrix whose dimension comprises X rows and is used to perform column selection and/or phase adjustment on $W_1$.

6. The method according to claim 5, wherein $$W_1 = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1 = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} \ X_V^{l'+1} \ \ldots \ X_V^{l'+N_V^b-1}]$, $l=0, \ldots, L, l'=f(l)$, $\tilde{X}_H^k = [X_H^{k'} \ X_H^{k'+1} \ \ldots \ X_H^{k'+N_H^b-1}]$, $k=0, \ldots, K, k'=f(k)$, and $\otimes$ represents a Kronecker product;
   wherein $\tilde{X}_H^k$ corresponds to a precoding matrix in a horizontal direction in $W_1$, $\tilde{X}_H^k$ corresponds to a beam group, $\tilde{X}_H^k$ is a set that comprises at least two column vectors, each column vector of $\tilde{X}_H^k$ is a discrete Fourier transform (DFT) vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ corresponds to a precoding matrix in a vertical direction in W1, $\tilde{X}_V^l$ corresponds to a beam group, $\tilde{X}_V^l$ is a set that comprises at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; and $N_V^b$ is a quantity of vectors in a beam group in the vertical direction; and
   wherein the first configuration information is configuration information of a codebook subset restriction corresponding to $\tilde{X}_H^k$, and the second configuration information is configuration information of a codebook subset restriction corresponding to $\tilde{X}_V^l$.

7. The method according to claim 1, wherein a precoding matrix comprised in the codebook whose quantity of antenna ports is X is represented as $W=W_1(k,l)*W_2$, wherein $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1(k,l) = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l = [X_V^{l'} \ X_V^{l'+1} \ \ldots \ X_V^{l'+N_V^b-1}]$, $l=0, \ldots, L, l'=f(l)$, $\tilde{X}_H^k = [X_H^{k'} \ X_H^{k'+1} \ \ldots \ X_H^{k'+N_H^b-1}]$, $k=0, \ldots, K, k'=f(k)$, and $\otimes$ represents a Kronecker product;
   wherein $\tilde{X}_H^k$ corresponds to a precoding matrix in a horizontal direction, $\tilde{X}_H^k$ corresponds to a beam group, $\tilde{X}_H^k$ is a set that comprises at least two column vectors, each column vector of $\tilde{X}_H^k$ is a discrete Fourier transform (DFT) vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ corresponds to a precoding matrix in a vertical direction, $\tilde{X}_V^l$ corresponds to a beam group, $\tilde{X}_V^l$ is a set that comprises at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; $N_V^b$ is a quantity of vectors in a beam group in the vertical direction; and $W_2$ is a matrix whose dimension comprises X rows and is used to perform column selection and/or phase adjustment on $W_1(k,l)$; and
wherein:
   the first configuration information is configuration information of a codebook subset restriction corresponding to $W_1(k,l)$, and the second configuration information is configuration information of a codebook subset restriction corresponding to $W_2$; or
   the first configuration information comprises fifth sub-configuration information and sixth sub-configuration information, wherein the fifth sub-configuration information is configuration information of a codebook subset restriction corresponding to $\tilde{X}_H^k$, and the sixth sub-configuration information is configuration information of a codebook subset restriction corresponding to $\tilde{X}_V^l$, and the second configuration information is configuration information of a codebook subset restriction corresponding to $W_2$.

8. A user equipment (UE), comprising:
   a receiver, configured to receive a reference signal that is of an antenna whose quantity of antenna ports is X and that is sent by a base station and configuration information of a codebook subset restriction for the quantity X of antenna ports, wherein the configuration information of the codebook subset restriction for the quantity X of antenna ports comprises first configuration information and second configuration information, and X is a positive integer greater than or equal to 2;
   a processor, configured to:
      determine, according to the configuration information of the codebook subset restriction for the quantity X of antenna ports, a precoding matrix on which channel measurement and feedback need to be performed, wherein the codebook subset restriction for the quantity X of antenna ports is for instructing the UE to select some precoding matrices from all precoding matrices in a codebook whose quantity of antenna ports is X for measurement and feedback; and obtain, via measurement according to the reference signal of the antenna whose quantity of antenna ports is X, the precoding matrix on which channel measurement and feedback need to be performed.

9. The UE according to claim 8, wherein the first configuration information is configuration information of a codebook subset restriction for a quantity X1 of antenna ports, and the second configuration information is configuration information of a codebook subset restriction for a quantity X2 of antenna ports, wherein X=X1×X2.

10. The UE according to claim 8, wherein the first configuration information is configuration information of a codebook subset restriction for a quantity X1 of antenna ports, and the second configuration information is configuration information of a codebook subset restriction for a quantity X2 of antenna ports, wherein X=X1×X2×2.

11. The UE according to claim 9, wherein the processor is further configured to:
perform a Kronecker product on a precoding matrix whose quantity of antenna ports is X1 and a precoding matrix whose quantity of antenna ports is X2 to obtain the precoding matrix on which channel measurement and feedback need to be performed.

12. The UE according to claim 11, wherein the processor is further configured to:
perform the Kronecker product on the precoding matrix whose quantity of antenna ports is X1 and the precoding matrix whose quantity of antenna ports is X2 to obtain $W_1$ of a precoding matrix whose quantity of antenna ports is X; and
obtain, according to a formula $W=W_1*W_2$, the precoding matrix on which channel measurement and feedback need to be performed, wherein $W_2$ is a matrix whose dimension comprises X rows and is for performing column selection and/or phase adjustment on $W_1$.

13. The UE according to claim 12, wherein $$W_1 = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1 = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l=[X_V^{l'} X_V^{l'+1} \ldots X_V^{l'+N_V^b-1}]$, l=0, ..., L, l'=f(l), $\tilde{X}_H^k=[X_H^{k'} X_H^{k'+1} \ldots X_H^{k'+N_H^b-1}]$, k=0, ..., K, k'=f(k), and $\otimes$ represents a Kronecker product;
wherein $\tilde{X}_H^k$ corresponds to a precoding matrix in a horizontal direction in $W_1$, $\tilde{X}_H^k$ corresponds to a beam group, $\tilde{X}_H^k$ is a set that comprises at least two column vectors, each column vector of $\tilde{X}_H^k$ is a discrete Fourier transform (DFT) vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ corresponds to a precoding matrix in a vertical direction in W1, $\tilde{X}_V^l$ corresponds to a beam group, $\tilde{X}_V^l$ is a set that comprises at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; and $N_V^b$ is a quantity of vectors in a beam group in the vertical direction; and
wherein the first configuration information is configuration information of a codebook subset restriction corresponding to $\tilde{X}_H^k$, and the second configuration information is configuration information of a codebook subset restriction corresponding to $\tilde{X}_V^l$.

14. The UE according to claim 8, wherein a precoding matrix comprised in the codebook whose quantity of antenna ports is X is represented as $W=W_1(k,l)*W_2$, wherein $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix} \text{ or } W_1(k,l) = \begin{bmatrix} \tilde{X}_V^l \otimes \tilde{X}_H^k & 0 \\ 0 & \tilde{X}_V^l \otimes \tilde{X}_H^k \end{bmatrix},$$

$\tilde{X}_V^l=[X_V^{l'} X_V^{l'+1} \ldots X_V^{l'+N_V^b-1}]$, l=0, ..., L, l'=f(l), $\tilde{X}_H^k=[X_H^{k'} X_H^{k'+1} \ldots X_H^{k'+N_H^b-1}]$, k=0, ..., K, k'=f(k), and $\otimes$ represents a Kronecker product;
wherein $\tilde{X}_H^k$ corresponds to a precoding matrix in a horizontal direction, $\tilde{X}_H^k$ corresponds to a beam group, $\tilde{X}_H^k$ is a set that comprises at least two column vectors, each column vector of $\tilde{X}_H^k$ is a discrete Fourier transform (DFT) vector, and a dimension of each column vector of $\tilde{X}_H^k$ is a quantity of co-polarized antennas in the horizontal direction; K is a quantity of beam groups in the horizontal direction; $N_H^b$ is a quantity of vectors in a beam group in the horizontal direction; $\tilde{X}_V^l$ corresponds to a precoding matrix in a vertical direction, $\tilde{X}_V^l$ corresponds to a beam group, $\tilde{X}_V^l$ is a set that comprises at least two column vectors, each column vector of $\tilde{X}_V^l$ is a DFT vector, and a dimension of each column vector of $\tilde{X}_V^l$ is a quantity of co-polarized antennas in the vertical direction; L is a quantity of beam groups in the vertical direction; $N_V^b$ is a quantity of vectors in a beam group in the vertical direction; and $W_2$ is a matrix whose dimension comprises X rows and is for performing column selection and/or phase adjustment on $W_1(k,l)$; and
wherein:
the first configuration information is configuration information of a codebook subset restriction corresponding to $W_1(k,l)$, and the second configuration information is configuration information of a codebook subset restriction corresponding to $W_2$; or
the first configuration information comprises fifth sub-configuration information and sixth sub-configuration information, wherein the fifth sub-configuration information is configuration information of a codebook subset restriction corresponding to $\tilde{X}_H^k$, and the sixth sub-configuration information is configuration information of a codebook subset restriction corresponding to $\tilde{X}_V^l$, and the second configuration information is configuration information of a codebook subset restriction corresponding to $W_2$.

15. The UE according to claim 8, wherein:
both the first configuration information and the second configuration information are sent by using higher layer signaling; or
the first configuration information is sent by using higher layer signaling, and the second configuration information is sent by using dynamic signaling.

16. The UE according to claim 8, wherein:
configuration information of a codebook subset restriction of antenna ports for a larger quantity of antenna ports in X1 and X2 is configured by using dynamic signaling, and configuration information of a codebook subset restriction of antenna ports for a smaller quantity of antenna ports in X1 and X2 is configured by using higher layer signaling; or configuration information of a codebook subset restriction of antenna ports for a larger quantity of antenna ports in X1 and X2 is configured by using higher layer signaling, and configuration information of a codebook subset restriction of antenna ports for a smaller quantity of antenna ports in X1 and X2 is configured by using dynamic signaling.

* * * * *